United States Patent
Sheikh et al.

(10) Patent No.: US 12,267,805 B2
(45) Date of Patent: Apr. 1, 2025

(54) METHOD FOR ESTIMATING A LOCATION OF AT LEAST ONE MOBILE NETWORK NODE AND RESPECTIVE NETWORK

(71) Applicant: Stichting IMEC Nederland, Eindhoven (NL)

(72) Inventors: Alireza Sheikh, Eindhoven (NL); Jac Romme, Schiedam (NL)

(73) Assignee: Stichting IMEC Nederland, Eindhoven (NL)

( * ) Notice: Subject to any disclaimer, the term of this patent is extended or adjusted under 35 U.S.C. 154(b) by 392 days.

(21) Appl. No.: 17/813,765

(22) Filed: Jul. 20, 2022

(65) Prior Publication Data

US 2023/0035737 A1 Feb. 2, 2023

(30) Foreign Application Priority Data

Jul. 23, 2021 (EP) ..................................... 21187335

(51) Int. Cl.
*H04W 64/00* (2009.01)
*H04W 4/02* (2018.01)

(52) U.S. Cl.
CPC ................................ *H04W 64/003* (2013.01)

(58) Field of Classification Search
CPC ..... H04W 4/02; H04W 64/00; H04W 64/003; G01S 5/0244; G01S 5/0278; G01S 5/0284
See application file for complete search history.

(56) References Cited

U.S. PATENT DOCUMENTS

| | | | | |
|---|---|---|---|---|
| 8,797,899 B2* | 8/2014 | Ruuska | ................. | G01S 5/0278 455/67.11 |
| 9,846,220 B2* | 12/2017 | Kong | .................. | H04W 64/003 |
| 10,896,667 B2* | 1/2021 | Muggleton | .......... | H04R 29/008 |
| 11,546,777 B2* | 1/2023 | Yang | .................... | H04W 64/00 |

FOREIGN PATENT DOCUMENTS

CN    111739096 A    10/2020

OTHER PUBLICATIONS

Extended European Search Report and Written Opinion, Application No. EP21187335.1, mailed May 13, 2022, 11 pages.

(Continued)

*Primary Examiner* — Quochien B Vuong
(74) *Attorney, Agent, or Firm* — McDonnell Boehnen Hulbert & Berghoff LLP

(57) ABSTRACT

Example embodiments relate to methods for estimating a location of at least one mobile network node and respective network. An example method for estimating a location of at least one mobile network node of a wireless communication network including the at least one mobile network node and at least two static network nodes includes performing initial range measurements between the at least two static network nodes in a pairwise manner. The method also includes determining an initial location estimate. Additionally, the method includes determining an estimate for corresponding noise samples. Further, the method includes estimating corresponding initial parameters of a Gaussian mixture noise model. In addition, the method includes determining a weighted sum of respective refined parameters of the Gaussian mixture noise model and the corresponding initial parameters of the Gaussian mixture noise model.

20 Claims, 15 Drawing Sheets

(56) References Cited

OTHER PUBLICATIONS

Di Franco, Carmelo, Amanda Prorok, Nikolay Atanasov, Benjamin Kempke, Prabal Dutta, Vijay Kumar, and George J. Pappas. "Calibration-free network localization using non-line-of-sight ultra-wideband measurements." In 2017 16th ACM/IEEE International Conference on Information Processing in Sensor Networks (IPSN), pp. 235-246. IEEE, 2017.

Lohrasbipeydeh, Hannan, and T. Aaron Gulliver. "Robust recursive RSSD based source localization in Gaussian mixture channels." IEEE Communications Letters 24, No. 11 (2020): 2498-2502.

Li, Kang, Jinghua Li, Yutao Jiao, Guoru Ding, and Shihua Dong. "An expectation maximization solution for RSS target localization by Gaussian mixture noise analysis." In Twelfth International Conference on Signal Processing Systems, vol. 11719, pp. 281-290. SPIE, 2021.

Raitoharju, Matti, and Simo Ali-Loytty. "An adaptive derivative free method for Bayesian posterior approximation." IEEE Signal Processing Letters 19, No. 2 (2011): 87-90.

Runnalls, Andrew R. "Kullback-Leibler approach to Gaussian mixture reduction." IEEE Transactions on Aerospace and Electronic Systems 43, No. 3 (2007): 989-999.

Schoenberg, Jonathan R., Mark Campbell, and Isaac Miller. "Localization with multi-modal vision measurements in limited GPS environments using Gaussian sum filters." In 2009 IEEE International Conference on Robotics and Automation, pp. 1423-1428. IEEE, 2009.

Schoenberg, Jonathan R., Mark Campbell, and Isaac Miller. "Posterior representation with a multi-modal likelihood using the gaussian sum filter for localization in a known map." Journal of Field Robotics 29, No. 2 (2012): 240-257.

Yin, Feng, Carsten Fritsche, Di Jin, Fredrik Gustafsson, and Abdelhak M. Zoubir. "Cooperative localization in WSNs using Gaussian mixture modeling: Distributed ECM algorithms." IEEE Transactions on Signal Processing 63, No. 6 (2015): 1448-1463.

Williams, Jason L., and Peter S. Maybeck. "Cost-function-based Gaussian mixture reduction for target tracking." In Proceedings of the sixth international conference of Information fusion, vol. 2, pp. 1047-1054. International Society of Information Fusion Cairns, Australia, 2003.

Pishdad, Leila. Online Bayesian estimation for indoor localization and positioning. McGill University (Canada), 2015.

Sendorek, Pierre, Karim Abed-Meraim, Maurice Charbit, and Sebastien Legoll. "Improvements of GNSS/INS Localization's Integrity with Gaussian Mixture Filters in a Bayesian Framework." In The 6th European Workshop on GNSS Signals and Signal Processing. 2013.

Song, Mingzhou, and Hongbin Wang. "Highly efficient incremental estimation of Gaussian mixture models for online data stream clustering." In Intelligent Computing: Theory and Applications III, vol. 5803, pp. 174-183. SPIE, 2005.

* cited by examiner

METHOD FOR ESTIMATING A LOCATION OF AT LEAST ONE MOBILE NETWORK NODE AND RESPECTIVE NETWORK

CROSS-REFERENCE TO RELATED APPLICATIONS

The present application is a non-provisional patent application claiming priority to European Patent Application No. EP 21187335.1, filed Jul. 23, 2021, the contents of which are hereby incorporated by reference.

FIELD OF THE DISCLOSURE

The disclosure relates to a method for estimating a location of at least one mobile network node of a wireless communication network comprising the at least one mobile network node and at least two static network nodes, and a wireless communication network with location estimation of at least one mobile network node, the wireless communication network comprising subscribers comprising the at least one mobile network node and at least two static network nodes.

BACKGROUND

Generally, in times of an increasing number of communication applications providing wireless connectivity capabilities, there is a growing need of a method for estimating a location of at least one mobile network node of a wireless communication network, and a wireless communication network with location estimation of at least one mobile network node.

SUMMARY

CN 111739096 A relates to a self-positioning method and a self-positioning system for a depth sensor during movement, wherein the method comprises the following steps: in a preset scene, defining a camera coordinate system of a depth sensor at an initial moment as a reference coordinate system; defining three-dimensional point cloud obtained by the depth sensor by using the reference coordinate system at the initial time as target point cloud; defining three-dimensional point cloud obtained by the depth sensor by using the current camera coordinate system at the current moment as reference point cloud; matching the reference point cloud with the target point cloud to obtain the six-dimensional pose of the depth sensor at the current moment; and positioning the depth sensor by utilizing the six-dimensional pose of the depth sensor at the current moment. In this context, noise is assumed as a known parameter and the probability of the pose of a sensor is modeled using Gaussian mixture model, which can lead to several inaccuracies especially in the case of an unknown ranging noise distribution.

Accordingly, example embodiments may provide a method for estimating a location of at least one mobile network node of a wireless communication network, and a wireless communication network with location estimation of at least one mobile network node, thereby ensuring a particularly high accuracy.

This may be implemented using the features of the first independent claim for a method for estimating a location of at least one mobile network node of a wireless communication network comprising the at least one mobile network node and at least two static network nodes, and the features of the second independent claim for a wireless communication network with location estimation of at least one mobile network node, the wireless communication network comprising subscribers comprising the at least one mobile network node and at least two static network nodes. The dependent claims contain further developments.

According to a first aspect of the disclosure, it is provided a method for estimating a location of at least one mobile network node of a wireless communication network comprising the at least one mobile network node and at least two static network nodes, the method comprising the steps of performing initial range measurements between the at least two static network nodes in a pairwise manner, determining an initial location estimate with respect to the at least one mobile network node on the basis of the initial range measurements, determining an estimate for corresponding noise samples on the basis of the initial location estimate and/or a respective location of at least one of the at least two static network nodes, estimating corresponding initial parameters of a Gaussian mixture noise model on the basis of the initial noise samples, and determining a weighted sum of respective refined parameters of the Gaussian mixture noise model and the corresponding initial parameters of the Gaussian mixture noise model.

In some cases, the location of the at least one mobile network node can be found based on noisy range measurements between the at least one mobile network node and the at least two static network nodes, which leads to a particularly high accuracy. Further, the number of the static network nodes can be limited to a rather small number such as four or eight. Additionally, it is noted that no calibration stage is required.

According to a first implementation form of the first aspect of the disclosure, determining the weighted sum comprises the usage of a momentum factor, wherein the momentum factor provides a balance between the respective refined parameters of the Gaussian mixture noise model before an iterative estimation and the respective refined parameters of the Gaussian mixture noise model after an iterative estimation. In some embodiments, for instance, accuracy can further be increased in a particularly efficient manner.

According to a second implementation form of the first aspect of the disclosure, estimating the corresponding initial parameters of the Gaussian mixture noise model is iterated such that the Gaussian mixture noise model fits best to the initial noise samples. In some embodiments, for example, complexity can be reduced, which leads to an increased efficiency.

According to a further implementation form of the first aspect of the disclosure, estimating the corresponding initial parameters of the Gaussian mixture noise model comprises determining the respective probability of contributing of the corresponding component of the Gaussian mixture noise model to each of the initial noise samples, and/or maximizing a respective match between the corresponding initial parameters of the Gaussian mixture noise model and the initial noise samples. In some embodiments, for instance, not only inaccuracies but also inefficiencies can further be reduced especially by increasing simplicity.

According to a further implementation form of the first aspect of the disclosure, the method further comprises the steps of performing further range measurements between the at least one mobile network node and the at least two static network nodes in a pairwise manner, and determining a refined location estimation with respect to the at least one mobile network node on the basis of the further range measurements. In some embodiments, for example, accuracy can further be increased in a very efficient manner.

According to a further implementation form of the first aspect of the disclosure, the method further comprises the step of determining refined noise samples on the basis of the further range measurements and/or the refined location estimation. In some embodiments, for instance, inaccuracies can further be reduced.

According to a further implementation form of the first aspect of the disclosure, the method further comprises the step of estimating the respective refined parameters of a Gaussian mixture noise model especially on the basis of the refined noise samples. In some embodiments, for example, efficiency can further be increased.

According to a further implementation form of the first aspect of the disclosure, estimating the respective refined parameters of the Gaussian mixture noise model is iterated especially such that the Gaussian mixture noise model fits best to the refined noise samples. In some embodiments, for instance, complexity can further be reduced, thereby increasing efficiency.

According to a further implementation form of the first aspect of the disclosure, estimating the respective refined parameters of the Gaussian mixture noise model comprises determining the respective probability of contributing of the corresponding component of the Gaussian mixture noise model to each of the refined noise samples, and/or maximizing a respective match between the respective refined parameters of the Gaussian mixture noise model and the refined noise samples. In some embodiments, for example, inefficiencies can further be reduced especially by increasing simplicity.

According to a further implementation form of the first aspect of the disclosure, the method further comprises the step of updating the respective refined parameters of the Gaussian mixture noise model on the basis of the weighted sum. In some embodiments, for instance, accuracy can further be increased in a particularly efficient manner.

According to a further implementation form of the first aspect of the disclosure, the method further comprises the step of checking if updating the respective refined parameters of the Gaussian mixture noise model is acceptable especially on the basis of Kullback-Leibler divergence or Bhattacharyya distance. In some embodiments, for example, inaccuracy can efficiently be forestalled.

According to a further implementation form of the first aspect of the disclosure, at least a part of the steps according to any of the implementation forms of the first aspect of the disclosure is repeated. In some embodiments, for instance, complexity can further be reduced, thereby increasing efficiency.

According to a further implementation form of the first aspect of the disclosure, the initial noise samples comprise or are ranging errors. Additionally or alternatively, the refined noise samples comprise or are ranging errors. In addition to this or as an alternative, noise is caused at least by multipath propagation of the corresponding signals within the wireless communication network. Further additionally or further alternatively, at least one (e.g., each) of the at least one mobile network node communicates in a bidirectional manner. In further addition to this or as a further alternative, at least one (e.g., each) of the at least two static network nodes communicates in a bidirectional manner.

Before the second aspect of the disclosure and its example embodiments are explained in detail in the following, it is noted that the features having been mentioned above in the context of the first aspect and its embodiments analogously apply without explicitly repeating the features.

According to a second aspect of the disclosure, it is provided a wireless communication network with location estimation of at least one mobile network node, the wireless communication network comprising subscribers comprising the at least one mobile network node and at least two static network nodes, wherein at least one subscriber is configured to perform initial range measurements between the at least two static network nodes in a pairwise manner, determine an initial location estimate with respect to the at least one mobile network node on the basis of the initial range measurements, determine an estimate for corresponding noise samples on the basis of the initial location estimate and/or a respective location of at least one of the at least two static network nodes, estimate corresponding initial parameters of a Gaussian mixture noise model on the basis of the initial noise samples, and determine a weighted sum of respective refined parameters of the Gaussian mixture noise model and the corresponding initial parameters of the Gaussian mixture noise model.

According to a first implementation form of the second aspect of the disclosure, at least one subscriber is configured to use a momentum factor for or in the context of determining the weighted sum, wherein the momentum factor provides a balance between the respective refined parameters of the Gaussian mixture noise model before an iterative estimation and the respective refined parameters of the Gaussian mixture noise model after an iterative estimation.

According to a second implementation form of the second aspect of the disclosure, at least one subscriber is configured to iterate estimating the corresponding initial parameters of the Gaussian mixture noise model such that the Gaussian mixture noise model fits best to the initial noise samples.

According to a further implementation form of the second aspect of the disclosure, estimating the corresponding initial parameters of the Gaussian mixture noise model comprises determining the respective probability of contributing of the corresponding component of the Gaussian mixture noise model to each of the initial noise samples, and/or maximizing a respective match between the corresponding initial parameters of the Gaussian mixture noise model and the initial noise samples.

Accordingly, it might be useful if at least one subscriber is configured to determine the respective probability of contributing of the corresponding component of the Gaussian mixture noise model to each of the initial noise samples, and/or to maximize a respective match between the corresponding initial parameters of the Gaussian mixture noise model and the initial noise samples.

According to a further implementation form of the second aspect of the disclosure, at least one subscriber is configured to perform further range measurements between the at least one mobile network node and the at least two static network nodes in a pairwise manner, and to determine a refined location estimation with respect to the at least one mobile network node on the basis of the further range measurements.

According to a further implementation form of the second aspect of the disclosure, at least one subscriber is configured to determine refined noise samples on the basis of the further range measurements and/or the refined location estimation.

According to a further implementation form of the second aspect of the disclosure, at least one subscriber is configured to estimate the respective refined parameters of a Gaussian mixture noise model especially on the basis of the refined noise samples.

According to a further implementation form of the second aspect of the disclosure, at least one subscriber is configured to iterate estimating the respective refined parameters of the Gaussian mixture noise model especially such that the Gaussian mixture noise model fits best to the refined noise samples.

According to a further implementation form of the second aspect of the disclosure, estimating the respective refined parameters of the Gaussian mixture noise model comprises determining the respective probability of contributing of the corresponding component of the Gaussian mixture noise model to each of the refined noise samples, and/or maximizing a respective match between the respective refined parameters of the Gaussian mixture noise model and the refined noise samples.

Accordingly, it might be useful if at least one subscriber is configured to determine the respective probability of contributing of the corresponding component of the Gaussian mixture noise model to each of the refined noise samples, and/or to maximize a respective match between the respective refined parameters of the Gaussian mixture noise model and the refined noise samples.

According to a further implementation form of the second aspect of the disclosure, at least one subscriber is configured to update the respective refined parameters of the Gaussian mixture noise model on the basis of the weighted sum.

According to a further implementation form of the second aspect of the disclosure, at least one subscriber is configured to check if updating the respective refined parameters of the Gaussian mixture noise model is acceptable especially on the basis of Kullback-Leibler divergence or Bhattacharyya distance.

According to a further implementation form of the second aspect of the disclosure, at least one subscriber is configured to repeat at least a part of the actions according to the corresponding subscriber configuration of any of the implementation forms of the second aspect of the disclosure.

According to a further implementation form of the second aspect of the disclosure, the initial noise samples comprise or are ranging errors. Additionally or alternatively, the refined noise samples comprise or are ranging errors. In addition to this or as an alternative, noise is caused at least by multipath propagation of the corresponding signals within the wireless communication network. Further additionally or further alternatively, at least one (e.g., each) of the at least one mobile network node communicates in a bidirectional manner. In further addition to this or as a further alternative, at least one (e.g., each) of the at least two static network nodes communicates in a bidirectional manner.

BRIEF DESCRIPTION OF THE DRAWINGS

Embodiments are now further explained with respect to the drawings by way of example only, and not for limitation. In the drawings.

DETAILED DESCRIPTION

Figure 1A:
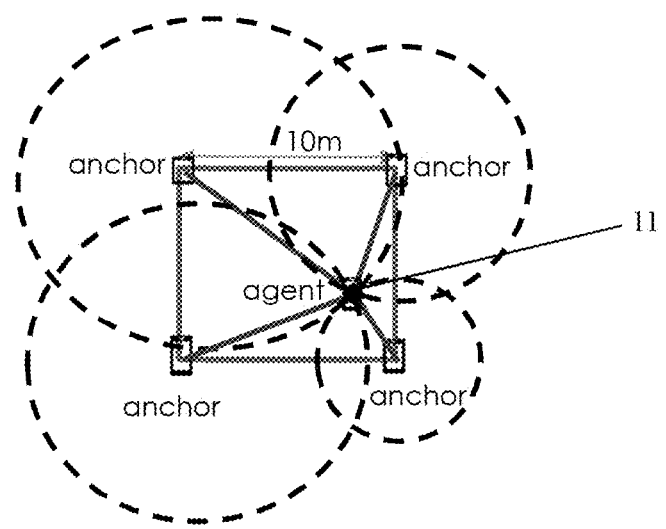
FIG. 1A illustrates an intersection-based localization with noise-free range measurements, according to example embodiments.
Figure 1B:
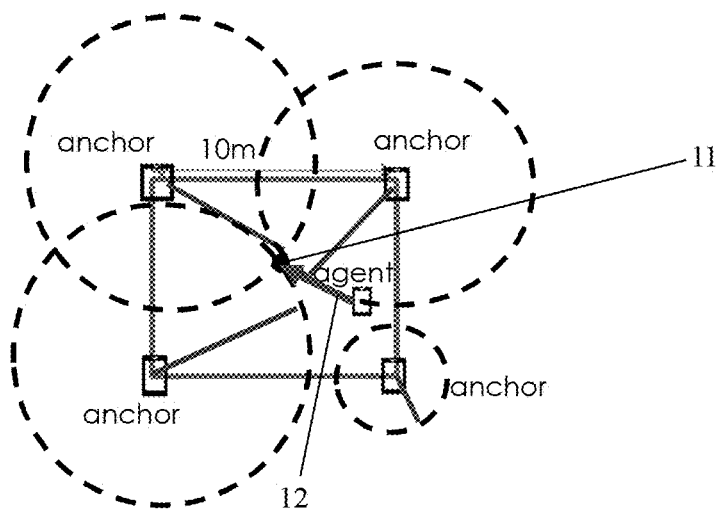
FIG. 1B shows an intersection-based localization with noisy range measurements, according to example embodiments.

FIGS. 1A and 1B illustrate a localization scenario. In this context, it is noted that localization of an agent with unknown location can be performed based on range measurements between the agent and some a-priori known locations, which can be referred to as anchors or access points. In this example case, such known locations are referred to as anchors as it can be seen from FIG. 1A or FIG. 1B, respectively.

For instance, it is further noted that the range measurement in ultra-wide band (UWB) or Bluetooth low-energy (BLE) radio systems can be based on:
 (i) Received signal strength indicator (RSSI);
 (ii) Time-of-arrival (ToA) or Time-difference-of-arrival (TDoA); and/or
 (iii) phase-based measurements.

As already mentioned above, FIGS. 1A and 1B illustrate an example of an interested scenario in the sense of the disclosure, which may comprise a 10 m-by-10 m room with one agent (mobile in the room) and four anchors (radios in each corner of the room).

The goal is to find the location of the agent based on the range measurements between the agent and anchors. If the ranges are noise-free, the intersection of the circles with radius of the ranges centred on each anchor determines the location of the agent, shown by the dot 11 in FIG. 1A.

In a real system, regardless of the ranging method, the measured range always contains noise. This noise is due to several reasons such as the reflective property of the propagation environment or nonidealities of the hardware, etc.

As it can be seen from FIG. 1B, the intersection of circles with radius of the noisy range measurements would result in erroneous localization, wherein the magnitude of the arrow 12 in FIG. 1B illustrates the corresponding localization error. To improve the localization performance, the distribution of the noise can be estimated, and then exploited in the context of localization.

In the sense of the disclosure, the parameters of the corresponding noise model can be estimated in an on-the-fly manner. Then, the estimated noise model is especially employed to localize the agent. By "on-the-fly" term, it is especially meant that there is no extensive dedicated calibration stage to perform multiple range measurements in different locations in order to estimate the noise model. Instead, as the agent moves in the environment, at each time instant where the ranging between agent and anchors are performed, example embodiments first update the latest estimate of the noise model and then use the updated model to estimate the location of the agent.

For further explanation, a range measurement may be considered between $N_A$ anchors and an agent. The range measured to the $i^{th}$, $i=\{1, \ldots, N_A\}$ anchor is given as $$r = \|x - \tilde{x}_i\|_2 + n_i, \quad (1)$$

wherein $\|.\|_2$ is the L2 norm, r is the measured range, $\tilde{x}_i$ is the anchor location, x is the agent's location, and $n_i$ is the measurement noise.

The measurement noise can be modeled using generic models such as Gaussian mixture (GM) model. Using GM, the probability density function (Pdf) of $n_i$ is given as $$P(n_i) = \sum_{j=1}^{N} \frac{\alpha_j}{\sqrt{2\pi\sigma_j^2}} e^{-\frac{(n_i - \mu_j)^2}{2\sigma_j^2}}, \quad (2)$$

wherein $\alpha_j$, $\mu_j$, and $\sigma_j$ are the $j^{th}$ component coefficient, mean, and standard deviation, respectively.

The parameters of the GM noise model can be estimated based on samples of the noise distribution using expectation maximization technique which is explained in the following.

Expectation maximization (EM) especially estimates the parameters of the GM, representing the noise distribution based on observations (samples) of the noise distribution. The samples of noise distribution can be collected based on a calibration stage, wherein for some a-priori known locations in the localization environment, the ranges to the anchors can be measured. Then, based on the locations of the anchors, which are also known, the samples of the noise distribution can be computed. These noise sample are then fed into an iterative procedure with some initialized GM parameters to estimate the GM distribution that fit the best into the noise samples. The output of EM is a GM noise model, which can then be used in the localization to improve the localization performance especially compared to an intersection-based localization.

By $\theta$, the set of parameters of the GM is denoted, representing noise model, i.e., $\theta=\{\alpha_j, \mu_j, \sigma_j\}$, $j=\{1, \ldots, N\}$. In the calibration phase, for $N_S$ known locations $x_k$, $k=\{1, \ldots, N_S\}$, and $N_A$ known location of anchors $\tilde{x}_i$ $i=\{1, \ldots, N_A\}$, the set of range measurements to anchors $r_{ki}$ may be performed.

Then, $\{r_{ki} - \|x_k - \tilde{x}_i\|_2\}$, wherein $i=\{1, \ldots, N_A\}$, $k=\{1, \ldots, N_S\}$ as a set of samples of the noise distribution may be computed. These noise samples are then used in the EM to find the parameters of GM, i.e., $\theta$. EM may be an iterative method which consists of two steps: (i) expectation (E) step and (ii) maximization (M) step.

In the following, the workflow of EM may be explained. Assume that EM is at iteration (l-1), with inputs of $\theta^{l-1}$ and noise samples $\{r_{ki} - \|x_k - \tilde{x}_i\|_2\}$, wherein $i=\{1, \ldots, N_A\}$, $k=\{1, \ldots, N_S\}$. The output of EM especially is the update GM parameters, i.e., $\theta^l$.

In the expectation step, the probability of contributing of the j-th component of GM to each noise sample $\{r_{ki} - \|x_k - \tilde{x}_i\|_2\}$ may be computed. This probability can be expresses as $$P(j|\theta^{l-1}, r_{ki}, \tilde{x}_i, x_k) = \frac{\frac{\alpha_j^{l-1}}{\sqrt{2\pi(\sigma_j^{l-1})^2}} e^{-\frac{(r_{ki} - \|x_k - \tilde{x}_i\|_2 - \mu_j^{l-1})^2}{2\pi(\sigma_j^{l-1})^2}}}{\sum_{v=1}^{N} \frac{\alpha_v^{l-1}}{\sqrt{2\pi(\sigma_v^{l-1})^2}} e^{-\frac{(r_{ki} - \|x_k - \tilde{x}_i\|_2 - \mu_v^{l-1})^2}{2\pi(\sigma_v^{l-1})^2}}}. \quad (5)$$

Note that (5) may be computed for all components $j \in \{1, 2, \ldots, N\}$ and all noise samples $\{r_{ki} - \|x_k - \tilde{x}_i\|_2\}$.

Furthermore, the parameters of $\theta^l$ in maximization step can be computed as:

$$\alpha_j^l = \frac{\sum_{k=1}^{N_S} \sum_{i=1}^{N_A} P(j|\theta^{l-1}, r_{ki}, \tilde{x}_i, x_k)}{N_A N_S} \quad (6.1)$$

$$\mu_j^l = \frac{\sum_{k=1}^{N_S} \sum_{i=1}^{N_A} (r_{ki} - \|x_k - \tilde{x}_i\|_2) P(j|\theta^{l-1}, r_{ki}, \tilde{x}_i, x_k)}{\sum_{k=1}^{N_S} \sum_{i=1}^{N_A} P(j|\theta^{l-1}, r_{ki}, \tilde{x}_i, x_k)} \quad (6.2)$$

$$\sigma_j^l = \frac{\sum_{k=1}^{N_S} \sum_{i=1}^{N_A} (r_{ki} - \|x_k - \tilde{x}_i\|_2 - \mu_j^l)^2 P(j|\theta^{l-1}, r_{ki}, \tilde{x}_i, x_k)}{\sum_{k=1}^{N_S} \sum_{i=1}^{N_A} P(j|\theta^{l-1}, r_{ki}, \tilde{x}_i, x_k)} \quad (6.3)$$

With respect to EM, in a nutshell, it is noted that for a given set of noise samples $\{r_{ki} - \|x_k - \tilde{x}_i\|_2\}$, wherein $i=\{1, \ldots, N_A\}$, $k=\{1, \ldots, N_S\}$ and initialized noise parameters $\theta^0 = \{\alpha_j^0, \mu_j^0, \sigma_j^0\}$, $j=\{1, \ldots, N\}$. EM especially iterates between (5) and (6.1)-(6.3) for a given number of iterations to estimate the parameters of the GM noise model that fits the best to the noise samples.

It is noted that EM provides an estimation for the GM model which can be used for localization, it especially relies on the assumption that many samples from the unknown noise distribution are available. These noise samples be gathered typically using an extensive calibration stage.

Nevertheless, in practical scenarios, an extensive calibration stage may be not allowed. Furthermore, the number of anchors/agents involved in the localization step may especially be limited (for instance, 4-8 anchors and one agent), which in turn means that only a limited number of noise samples are available for estimating the GM model.

In such use cases, EM-type schemes cannot provide a good GM estimation about the noise model, yielding a poor localization performance. Therefore, example embodiments jointly localize the agent and estimate noise distribution especially based on the limited number of samples/range measurements without having an extensive calibration stage.

An on-the-fly localization may be performed, which can also be dubbed as joint momentum-based Gaussian mixture model update and positioning, in short MGMP.

In a high-level view, MGMP especially attempts to progressively improve the GM estimation while performing localization. Concretely, at a given time instant corresponding to an unknown location of the agent, MGMP may first employ the latest GM estimate and the noisy range measurements between the agent and anchors to find an initial estimate for the location of the agent.

Then, especially using such initial location estimate and the location of the anchors, the samples of the ranging noise distribution can be computed. The samples of the ranging noise distribution and the latest GM estimate are then can be used to update the GM estimate. Furthermore, the updated GM estimate can be used to localize the agent. It is remarked that the initialization stage of the method may especially provide the first GM estimate to start the localization. In a high-level, the MGMP especially contains five steps, which are summarized below.

A first step may be called initialization step. This step especially provides the first GM estimate to start the localization stage. In the initialization step, the parameters (mean, standard deviation, probability of each component) for the first GM may be initialized.

Then, the range measurements between anchors are especially utilized to update the initialized GM. Furthermore, a set of values for the momentum factor may be considered. For localization in a static environment, i.e., localization in the environment, which is not changing, the momentum coefficient can be a decreasing function over the time. Note that the initialization may be only performed one time, hence, step 1 is especially not performed in each GM update and localization which can be done through step 2 to step 5.

Moreover, the second step may comprise computing the noise samples and a new GM estimate. In this step, first, an initial estimate for the location of the agent may be computed especially using the latest GM estimate and the noisy range measurements between the agent and anchors. Then, especially using the location of the anchors and the initial location estimate of agent, the noise samples of ranging noise distribution can be computed. Furthermore, EM can be performed with the input of the computed noise samples and the latest GM estimate (e.g., yielding a new GM estimate).

With respect to the third step, it is noted that the third step may comprise momentum-based Gaussian mixture and Gaussian merging. In this step, the new GM estimate from the second step and the latest GM estimate may be used to come up with a candidate GM for updating the GM estimation. In particular, a weighted sum of the latest GM estimate (the GM utilized as the input of step 2) and the new GM estimate (the GM resulted as the output of step 2) can be computed using the initialized set of momentum factors from step 1. This weighted sum may be referred to as momentum-based Gaussian mixture, wherein the term "momentum" especially refers to the fact that the GM estimation improvement is gradually performed in the sense of the disclosure. The goal of such weighted sum especially is to update the GM estimation by not relying only on the output step 2, as it is computed based on few noise samples. As the weighted sum may double the number of GM components which may result in overfitting, the GM components from the weighted sum are especially merged mutually such that the statistical properties of the merged component stays the same as that of the sum of two components from the weighted sum.

Now, with respect to the fourth step, the fourth step may comprise a check for accepting the candidate GM. In this step, a statistical check may be devised to decide whether MGMP accepts the candidate GM for updating the GM estimate or not. In case that the candidate GM is not accepted, the latest GM estimate is used for updating the GM estimate.

As in each time instant, the GM may be updated based on few noise samples, especially comparing two consecutive time instances, there should not be a large deviation between the distribution of the latest GM estimate and the candidate GM. However, it is possible that noise samples are all from the tail of true noise distribution. In this case the GM resulted as the output of step 3 may become dramatically different than the latest GM estimate and the candidate GM can be considered as an outlier. The devised statistical check especially attempts to find such outliers in updating the GM and improves the convergence of example embodiments. It is noted that there are several statistical metrics that can be used to compare two distributions, for instance, Kullback-Leibler (KL) divergence or Bhattacharyya distance. In this context, it might be useful to use KL divergence, which especially improves better the convergence of example embodiments.

With respect to the fifth step, it is noted that the fifth step may comprise localization. In this step, the location of the agent will be estimated especially using the updated GM estimate about the ranging noise. Optionally, in a limit it might be removed.

It is remarked that a variant of MGMP can be obtained by omitting the step 5. In such variant, the initial estimate about the location of the agent (which may be computed in step 2) can especially be used as the estimated location and the updated GM model from step 4 can be used for the next localization time instant.

For a detailed explanation, it is noted that in the sense of the disclosure, MGMP is especially based on EM, momentum-based GM update, GM merging, and KL divergence. In the following, momentum-based GM update, GM merging, and KL divergence are firstly explained. Then, the workflow of the MGMP will be explained in a step-by-step manner.

It is further noted that in the following description, the term iteration may especially be used for referring to the time instant where the ranging and localization are performed. l=1 means the start of the localization where the method is initialized and gives the first estimate of the ranging noise model. Then, l=2 means that the first time that the ranging between agent and anchors are performed, where MGMP updates the previous noise model based on the new range measurements and then localizes the agent.

With respect to the above-mentioned momentum-based GM update, it is noted that, as will be explained later, at each iteration MGMP may employ EM. If the number of available noise samples for GM estimation is limited, EM routine will especially tend to suppress some GM components. Then, the GM update become less likely compared to the underlying noise model, hence, the corresponding localization does not perform well.

As an example, in FIGS. 1A and 1B, there are only four range measurements in each iteration. After computing the four noise samples corresponding to four range measurements, the EM should update the noise model using only these four noise samples. The idea of momentum-based GM update especially is to not fully trust on the GM update yielded by applying EM, as EM update is based on a few noise samples. Instead, it may be considered a momentum between the latest GM estimation (which is used as the input for EM) and the outcome of EM.

It is assumed that the latest estimate of the GM parameters is $\theta^{l-1}$, and $\theta^e = \{\alpha_j^e, \mu_j^e, \sigma_j^e\}$, $j=\{1, \ldots, N\}$ is the GM parameter estimation of EM (resulted by applying EM with noise samples and $\theta^{l-1}$ as the inputs). Then, MGMP may update the GM parameters as follows:

$$P(n) = (\beta_l)\left(\sum_{j=1}^{N} \frac{\alpha_j^e}{\sqrt{2\pi(\sigma_j^e)^2}} e^{-\frac{(n-\mu_j^e)^2}{2\pi(\sigma_j^e)^2}}\right) + (1-\beta_l)\left(\sum_{j=1}^{N} \frac{\alpha_j^{l-1}}{\sqrt{2\pi(\sigma_j^{l-1})^2}} e^{-\frac{(n-\mu_j^{l-1})^2}{2\pi(\sigma_j^{l-1})^2}}\right), \quad (7)$$

wherein $\beta_l$ is a momentum factor which especially provides a balance between the latest GM estimation and the outcome of EM. It can be easily checked that (7) is a valid distribution. After explaining the workflow of the MGMP, the values for $\beta_l$ will be provided.

With respect to the above-mentioned Gaussian mixture merging, it is noted that especially using the momentum GM update, the number of GM components is doubled (see equation (7)). To keep the same number of components and prevent overestimation of the noise parameters (e.g., at each iteration of MGMP), the GM components are especially mutually merged (e.g., such that the statistical moments of the merge components are preserved).

It is assumed that there are two GM components with parameters $\theta_1=\{\alpha_1, \mu_1, \sigma_1\}$, $\theta_2=\{\alpha_2, \mu_2, \sigma_2\}$. The goal is to find a merged GM component which has the same component probability, mean, and variance. By $\theta_m=\{\alpha_m, \mu_m, \sigma_m\}$, the parameters of the merged GM component may be denoted. The following relation should hold with respect to the Pdf of the merged component $\theta_m$ and $\theta_1$ and $\theta_2$:

$$\frac{\alpha_m}{\sqrt{2\pi(\sigma_m)^2}}e^{-\frac{(n-\mu_m)^2}{2\pi(\sigma_m)^2}} = \frac{\alpha_1}{\sqrt{2\pi(\sigma_1)^2}}e^{-\frac{(n-\mu_1)^2}{2\pi(\sigma_1)^2}} + \frac{\alpha_2}{\sqrt{2\pi(\sigma_2)^2}}e^{-\frac{(n-\mu_2)^2}{2\pi(\sigma_2)^2}} \quad (8)$$

From (8), it can be shown that the component probability, mean, and variance corresponding to $\theta_m$ can be computed as $$\alpha_m = \alpha_1 + \alpha_2 \quad (9.1)$$

$$\mu_m = \frac{\alpha_1\mu_1 + \alpha_2\mu_2}{\alpha_m} \quad (9.2)$$

$$(\sigma_m)^2 = \frac{\alpha_1(\sigma_1)^2 + \alpha_1(\mu_1)^2 + \alpha_2(\sigma_2)^2 + \alpha_2(\mu_2)^2}{\alpha_m} - (\mu_m)^2 \quad (9.3)$$

In MGMP, two GM components may be approximated similarly as one Gaussian, in which the corresponding moments can be computed using equations (9.1) to (9.3).

To additionally clarify the momentum-based GM update and GM merging, a numerical example is provided in the following. In this context, the setup given in FIGS. 1A and 1B is considered. In addition to this, it is assumed that the original GM noise model has two components $\{\alpha_1=0.7, \mu_1=1.5, \sigma_1=0.5\}$, $\{\alpha_2=0.3, \mu_2=4.5, \sigma_2=0.5\}$. Furthermore, the latest GM estimation has two components $\{\alpha_1=0.666, \mu_1=1.43, \sigma_1=0.37\}$, $\{\alpha_2=0.333, \mu_2=4.21, \sigma_2=0.153\}$, and there is a length-four noise sample observation $\{4.75, 2.14, 4.12, 4.7\}$ which corresponds to four ranges and is shown by the circles 21 in FIG. 2.

Figure 2:
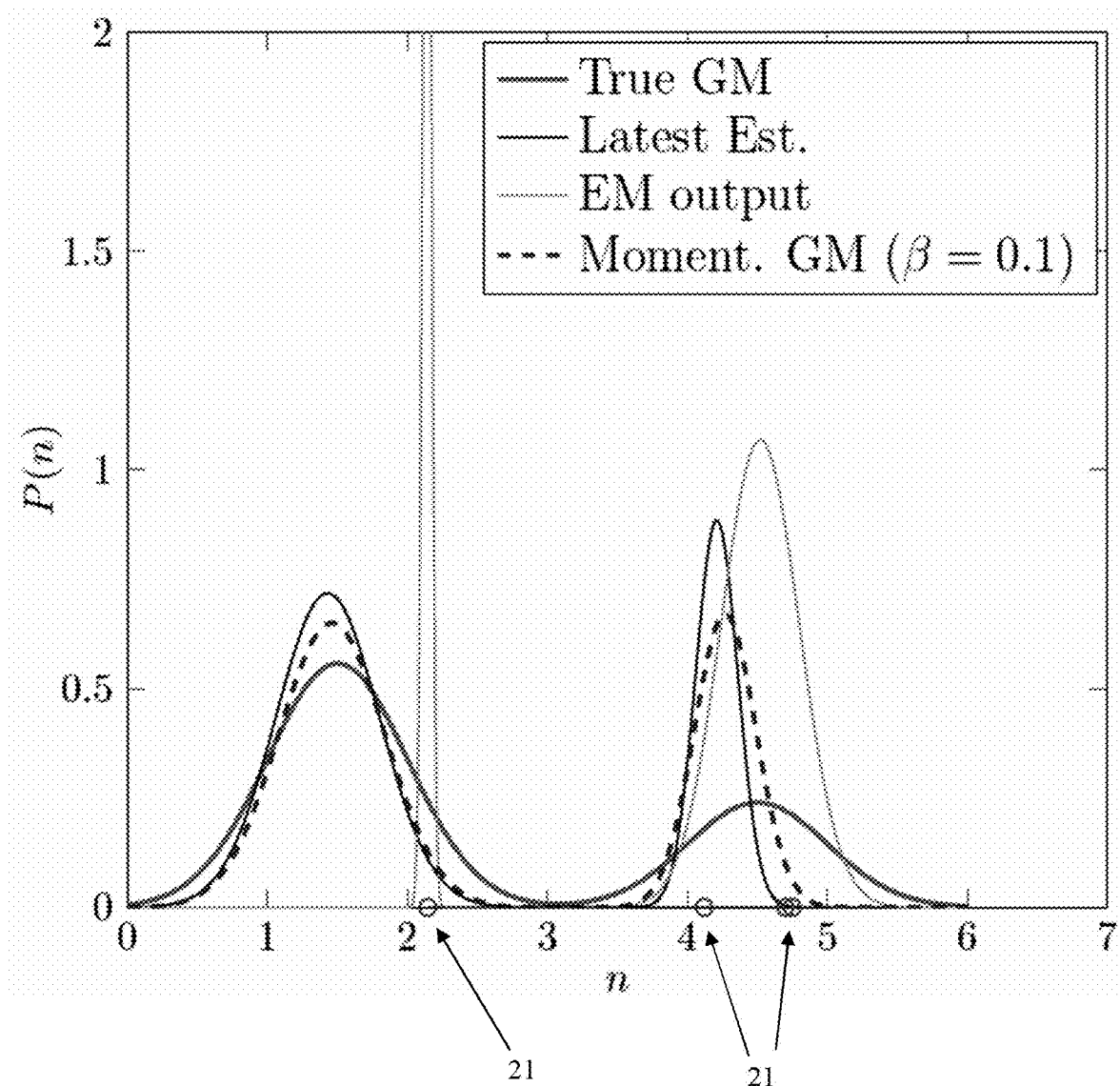
FIG. 2 shows a comparison between the Pdf of GM in a numerical example, according to example embodiments.

Employing the EM with the latest GM estimate and observation set, yields a GM with two components $\{\alpha_1=0.25, \mu_1=2.14, \sigma_1=0.000036\}$, $\{\alpha_2=0.75, \mu_2=4.52,$ $\sigma_2=0.28\}$, which is shown in FIG. 2 As component with $\sigma_1=0.000036$ is hard to visualize compared to the other GM component, the variance is increased to be able to visualize in FIG. 2.

Although the first GM component of the original noise distribution is dominant (component factor 0.7), as the noise samples are more towards the second GM component of the original noise distribution, the EM tends to suppress the first component, yielding a GM which is less similar to the original noise distribution compared to the input of the EM routine. Performing momentum-based GM with $\beta_1=0.1$ and Gaussian merging results in a GM with two components $\{\alpha_1=0.62, \mu_1=1.46, \sigma_1=0.39\}$, $\{\alpha_2=0.37, \mu_2=4.27, \sigma_2=0.22\}$, which is also shown in FIG. 2.

Figure 3:
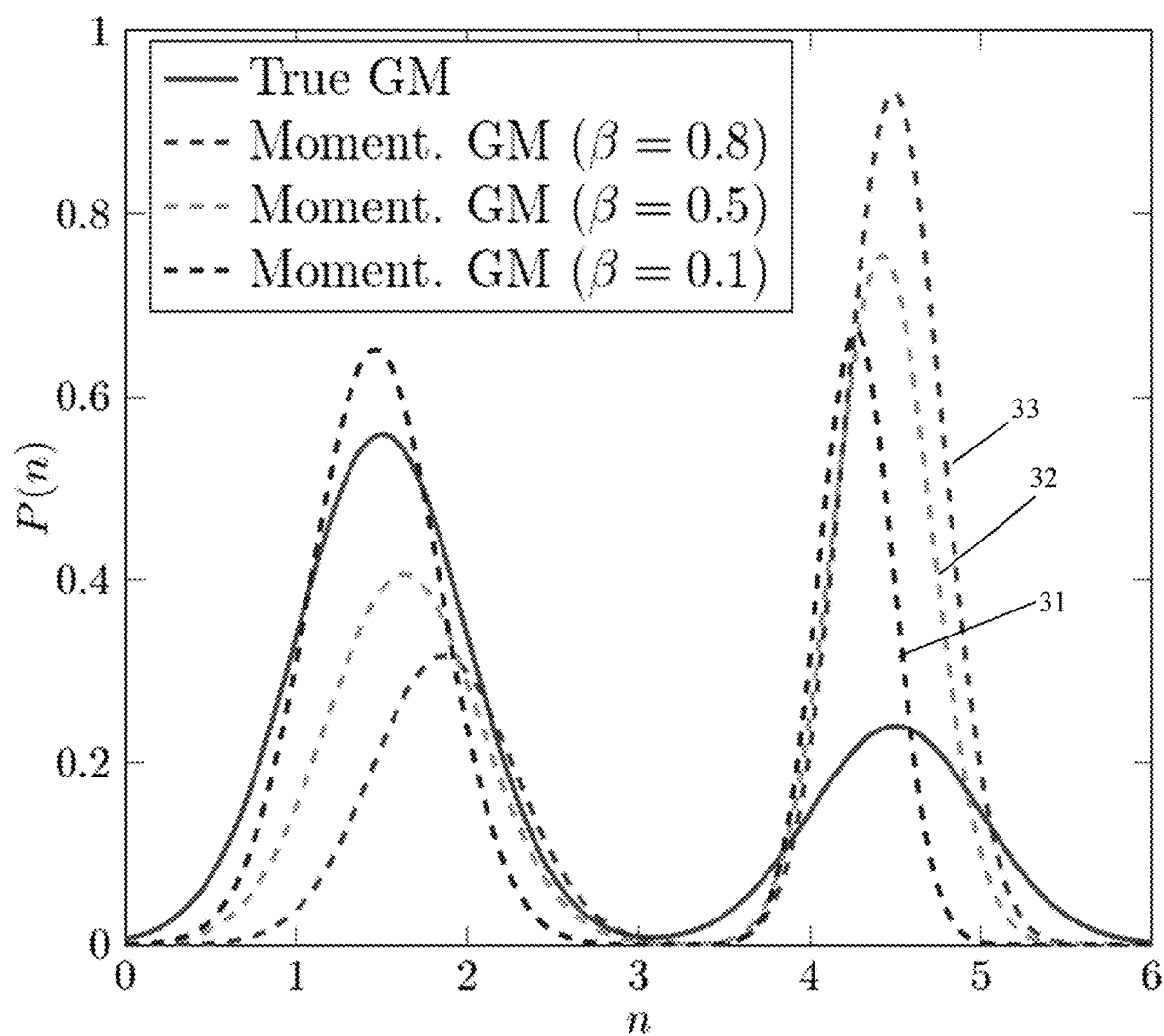
FIG. 3 shows a comparison between the Pdf of momentum-based GM in a numerical example for different momentum factors, according to example embodiments.

One can see that the proposed momentum-based GM update prevents suppressing the first component and yields a better estimation of the noise distribution compared to the output of the EM routine. In FIG. 3, the GM resulting from example embodiments is shown for different momentum factors as illustrated by curves 31 (0.1), 32 (0.5), 33 (0.8).

As it can be expected, since the output of EM routine is less similar to the original GM distribution than the previous estimate of the noise distribution, the lowest provides the best momentum-based GM.

With respect to the above-mentioned KL divergence, it is noted that KL divergence is a metric to evaluate the statistical distance between two distributions. The lower the KL divergence between two distributions means that the distributions are more similar.

In the following, there are defined p(x) and q(x) as two continuous Pdfs. KL divergence between p(x) and q(x) is defined as $$KL(p(x)\|q(x)) = \int_{-\infty}^{\infty} p(x)\log_e\left(\frac{p(x)}{q(x)}\right)dx \quad (10)$$

Note that when q(x)=p(x), then KL(p(x)||q(x))=0. This means that the more similar of two Pdfs, the less value of the corresponding KL divergence.

Again, with respect to the MGMP, in the following, it is assumed that there are $N_A$ anchors, and at each iteration (time instant), there are $N_S$ agents. It is remarked that the special case of $N_S=1$, $N_A=4$, corresponds to the scenario shown in FIGS. 1A and 1B.

Figure 4:
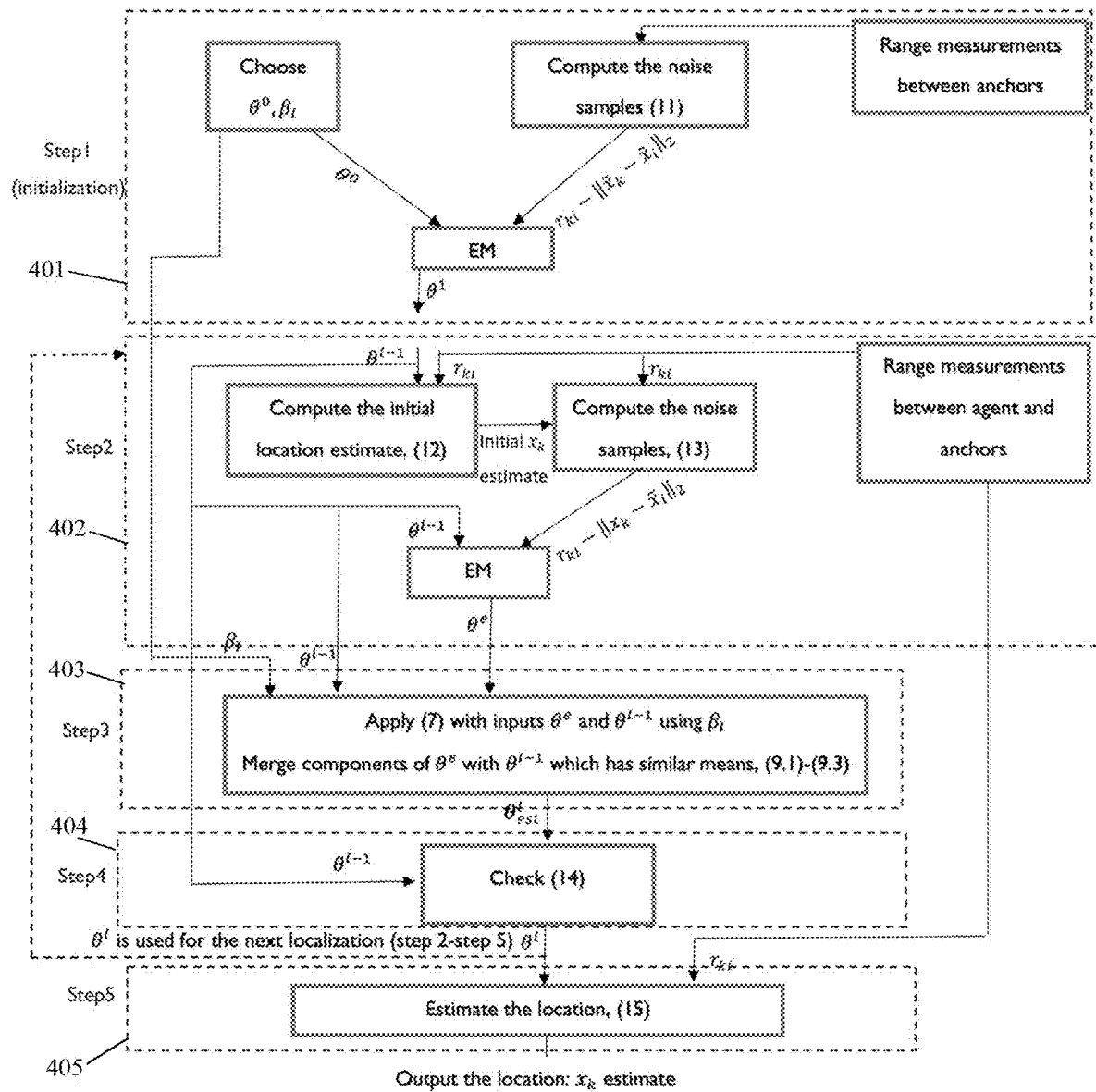
FIG. 4 shows a flow chart of a method, which is called MGMP, according to example embodiments.

As it can be seen from FIG. 4 showing an example flow chart of MGMP in the sense of the disclosure, especially according to the initialization step 401, MGMP is initialized with a set of parameters for the GM noise model, i.e., $\theta^0=\{\alpha_j^0, \mu_j^0, \sigma_j^0\}$, j=\{5, . . . , N\}. Furthermore, a set of momentum coefficients $\beta_l$, l=\{1, 2, 3 . . . \} are considered. We provide the values for and the initialization parameters $\theta^0=\{\alpha_j^0, \mu_j^0, \sigma_j^0\}$ after the explanation of the workflow of MGMP.

Firstly, the range measurements between anchors may be used to compute the ground truth noise samples. There are $$\frac{N_A(N_A-1)}{2}$$

range measurements between anchors in a scenario with $N_A$ anchors. As the location of the anchors are known, the noise samples can be computed as $$r_{ki} - \|\tilde{x}_k - \tilde{x}_i\|_2, i = \{1, \ldots, N_A\}, k = \left\{1, \ldots, \frac{N_A(N_A-1)}{2}\right\}, i \neq k \quad (11)$$

wherein $r_{ki}$ is the range measurement between anchor i and anchor k and $\tilde{x}_k$ is the position of the $k^{th}$ anchor.

Then, EM algorithm (see above-mentioned equations (5), (6.1) to (6.3)) is performed with the noise samples $\{r_{ki}-\|\tilde{x}_k-\tilde{x}_i\|_2\}$ and initial parameters $\theta^0$, yielding the parameter estimate $\theta^1$. $\theta^1$ is then used for starting the localization stage in MGMP algorithm. Note that the initialization is just performed one time, hence, step 1 is especially not a part of iterative stage of the MGMP where the GM is updated, and the location of the agent is estimated.

After initialization, the other steps of MGMP are as follows. Especially without loss of generality, it is assumed that MGMP is at time instant (l−1), wherein the parameters of the latest GM estimate are $\theta^{l-1}$, and $r_{ki}$, i={1, ..., $N_A$}, k={1, ..., $N_S$} are the range measurements between $N_S$ agents and $N_A$ anchors.

In accordance with the second step 402 of FIG. 4, the following optimization may be solved to find the initial estimation about the location of agents:

$$x_k^i = \text{argmin}_{x_k} \sum_{i=1}^{N_A} \sum_{j=1}^{N} \frac{(r_{ki} - \|x_k - \tilde{x}_i\|_2 - \mu_j^l)^2}{(\sigma_j^l)^2} P(j|\theta^l, r_{ki}, \tilde{x}_i, x_k) \quad (12)$$

Then, based on these initial estimated locations, the location of anchors $\tilde{x}_i$, and range measurements $r_{ki}$, the noise sample are computed as $$r_{ki}-\|x_k-\tilde{x}_i\|_2, i=\{1, \ldots, N_A\}, k=\{1, \ldots, N_S\} \quad (13)$$

Then, EM algorithm (see above-mentioned equations (5) and (6.1) to (6.3)) is performed with the inputs of $\{r_{ki}-\|x_k-\tilde{x}_i\|_2\}$ and $\theta^l$, yielding $\theta^e=\{\alpha_j^e, \mu_j^e, \sigma_j^e\}$, j={1, ..., N} as the output (new GM estimate).

Furthermore, in accordance with the third step 403, two GMs with parameters $\theta^{l-1}$ and $\theta^e$ may be combined using $\beta_l$, according to the above-mentioned equation (7), yielding 2N components.

Then, pair of components in $\theta^{l-1}$ and $\theta^e$ are especially merged, yielding final estimated GM with N components.

Firstly, it is selected which pair of components in $\theta^{l-1}$ and $\theta^e$ should be merged after combining. To do so, the dominant component of $\theta^{l-1}$, i.e., component with largest $\alpha_j^{l-1}$, j={1, ..., N} may be merged with the component in $\theta^e$ which has the closest mean.

Similarly, the second dominant component of $\theta^{l-1}$ may be merged with the component of $\theta^e$ which is not selected yet and has the closest mean. This selection procedure continues, until all N components of $\theta^{l-1}$ are especially paired with a component in $\theta^e$. Then, the selected components may be combined with using $\beta_l$, according to the above-mentioned equation (7), and merged according to the above-mentioned equations (9.1) to (9.3), yielding $\theta_{est}^l$. $\theta_{est}^l$ is especially the candidate GM for updating the GM estimate.

Moreover, especially according to the fourth step 404, MGMP may have a condition to whether accept the candidate GM $\theta_{est}^l$ or not.

In the following, $\tau_{l-1}^{KL}$ is defined as the average of the KL divergence between two consecutive estimations of MGMP, computed up to time instant (l−1). Note that $\tau_{l-1}^{KL}$, can be progressively computed along with GM estimation of MGMP at each time instant, i.e., no need to have a memory about KL divergence between two consecutive estimations of MGMP up to time instant (l−1). The following condition is checked for updating $\theta^l$ according to equation (14):

$$\theta^l = \begin{cases} \theta_{est}^l & \text{if } KL\left(\sum_{j=1}^{N} \frac{\alpha_j^{l-1}}{\sqrt{2\pi(\sigma_j^{l-1})^2}} e^{-\frac{(n-\mu_j^{l-1})^2}{2n(\sigma_j^{l-1})^2}} \| \sum_{j=1}^{N} \frac{\alpha_{j,est}^l}{\sqrt{2\pi(\sigma_{j,est}^l)^2}} e^{-\frac{(n-\mu_{j,est}^l)^2}{2n(\sigma_{j,est}^l)^2}} \right) < 20\tau_{l-1}^{KL} \\ \theta^{l-1} & \text{else} \end{cases}$$

In a nutshell, the foregoing equation (14) especially ensures that the updated GM estimate $\theta^l$ does not vary a lot with respect to the latest estimate $\theta^{l-1}$. If it varies a lot (first condition of (14)), the latest GM estimate ($\theta^{l-1}$) may be used as the current GM estimate ($\theta^l$).

Furthermore, in accordance with the fifth step 405 of FIG. 4, the localization is performed based on the updated GM estimate $\theta^l$. Concretely, the location of the $k^{th}$ agent is especially computed as $$x_k = \text{argmin}_{x_k} \sum_{i=1}^{N_A} \sum_{j=1}^{N} \frac{(r_{ki} - \|x_k - \tilde{x}_i\|_2 - \mu_j^l)^2}{(\sigma_j^l)^2} P(j|\theta^l, r_{ki}, \tilde{x}_i, x_k). \quad (15)$$

After localization, the GM with parameter $\theta^l$ may be used as an input for the next joint localization and GM estimation ($\theta^{l+1}$) corresponding to iteration (time instant) (l+1), which can especially be done by repeating the above-mentioned steps 2 two 5 as shown by FIG. 4.

In the following, it will be explained, how the parameters $\beta_l$ and $\theta^0$ can be chosen.

With respect to choosing $\beta_l$, it is noted that for localization in the static environment, i.e., localization in the environment, which is not changing over the period of localization, the momentum coefficient may especially be a decreasing function over the time. This means that as example embodiments gather more and more noise samples, the GM estimation should converge to an estimation of the underlying GM noise model. An example of such scenario is localization of an agent in a building or a factory hall. The following two options of $\beta_l$ are used for the simulation results as well as testing of example embodiments on the measurement data:

$$\beta_l = \begin{cases} 0.05 & 1 \leq l \leq 8 \\ 0.04 & 9 \leq l \leq 11 \\ 0.03 & 12 \leq l \leq 18 \\ 0.02 & 19 \leq l \leq 20 \\ 0.01 & 21 \leq l \leq 23 \\ 0.005 & \text{others} \end{cases}$$

$$\beta_l = \frac{2N_A}{\frac{N_A(N_A-1)}{2} + lN_A}, l = 1, 2, \ldots$$

Furthermore, with respect to choosing $\theta^0$, MGMP has been tested with initialization of GM components with equal probabilities, wherein the standard deviation of each component is equal to 0.5, i.e., $$\alpha_1^0 = \ldots = \alpha_N^0 = \frac{1}{N} \text{ and } \sigma_1^0 = \ldots = \sigma_N^0 = 0.5.$$

Selecting the mean for each component in the initial GM, especially depends on the employed ranging method. For the application of phase-based ranging where example embodiments are tested, typically there is 1 m to 2 m bias of error in ranging, hence, the mean of noise components can be selected in this range.

For applying example embodiments in other ranging systems, one can run a standard K-means method based on range measurements between anchors. The K-means method may be a clustering method and find the mean of N noise components contributing the noise of measurements between anchor, i.e., the output of K-means method can be used as $\mu_1^0, \ldots \mu_N^0$.

With respect to the computational complexity of MGMP in the sense of example embodiments, it is noted that, as explained before, MGMP employs EM algorithm as well as and Gaussian merging. The computation complexity of EM algorithm (see equations (5) and (6.1) to (6.3)) as well and Gaussian merging (see equations (9.1) to (9.3)) is at the cost of few multiplications and additions, which is not significant.

In some embodiments, solving the above-mentioned equation (15) for finding the location of the agent is most computationally heavy stage of MGMP. However, as one can show the cost function of (15) is convex, hence, any standard low-complex Gradient decent method can be employed to find the solution of equation (15). Overall, the computational complexity of MGMP is not high.

In the context of maximum likelihood localization, it is noted that if the parameters of the GM representing the noise distribution are known (i.e., $\{\alpha_j, \mu_j, \sigma_j\}, j=\{1, \ldots, N\}$), the maximum likelihood (ML) may provide an estimation for the location of the agent.

The ML estimate of the location of the agent can be expressed as $$\hat{x} = \text{argmax}_x \log \left( \prod_{i=1}^{N_A} P(r - \|x - \tilde{x}_i\|_2 \mid \{\alpha_j, \mu_j, \sigma_j\}) \right) = \tag{16}$$

$$\text{argmax}_x \sum_{i=1}^{N_A} \log \left( \sum_{j=1}^{N} \frac{\alpha_j}{\sqrt{2\pi\sigma_j^2}} e^{-\frac{(r-\|x-\tilde{x}_i\|_2-\mu_j)^2}{2\sigma_j^2}} \right).$$

Note that the cost function of (16) is non-convex, therefore, the performance of localization is sensitive to the initialization of the optimization.

In the sense of example embodiments, it is referred to ML localization, where optimization in (16) initialized by the true location of the agent.

In other words, for solving the above-mentioned equation (16), clearly the best initialization of the optimization problem in (16) may be the true location of the agent, hence, ML based localization with such initialization especially provides the best localization performance, i.e., performance upper bound.

Furthermore, in the context of least squares localization, it is noted that in least squares (LS)-based localization, one can assume that there is no a-priori knowledge about the underlying range measurement noise. The LS-localization may be performed by minimizing the sum of the squared ranging errors.

The LS estimate about the location of the agent is given as $$\hat{x} = \text{argmax}_x \sum_{i=1}^{N_A} \|r - \|x - \tilde{x}_i\|_2\|_2^2. \tag{17}$$

Figure 5:
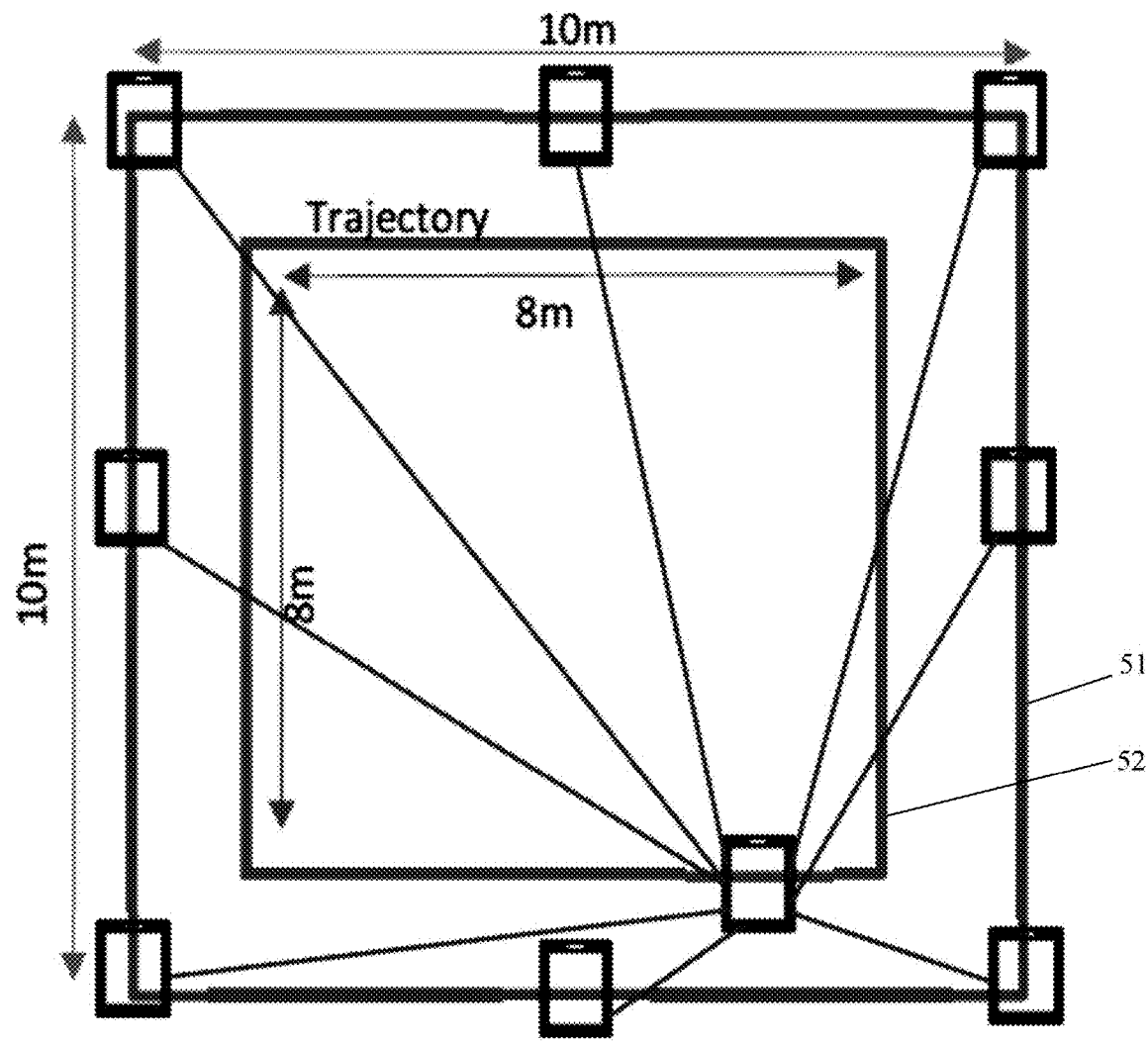
FIG. 5 illustrates a simulation setup, according to example embodiments.

Now, with respect to simulation and measurement results, it is noted that FIG. 5 shows the respective example simulation setup. For the simulation setup, a 10 m by 10 m room has been considered, wherein the anchors are located around the room with 5 m distance to the neighboring anchors.

There are considered eight anchors, which may be located on the square 51, and one agent, i.e., $N_A=8$, $N_S=1$. The square 52 denotes the trajectory, where the agent moves on. On the trajectory, the distance between the location of the agent at each time instance compared to the previous location is 0.5 m.

It is assumed that the agent moves on the trajectory two times, yielding the total of 130 locations. It is further assumed that the underlying noise model had two components, i.e., $\{\alpha_1=0.7, \mu_1=1.5, \sigma_1=0.5\}$, $\{\alpha_2=0.3, \mu_2=4.5, \sigma_2=0.5\}$. As it can be seen, this simulation scenario is especially the same as the one according to FIG. 1, wherein just the number of anchors is increased from 4 to 8.

Figure 6:
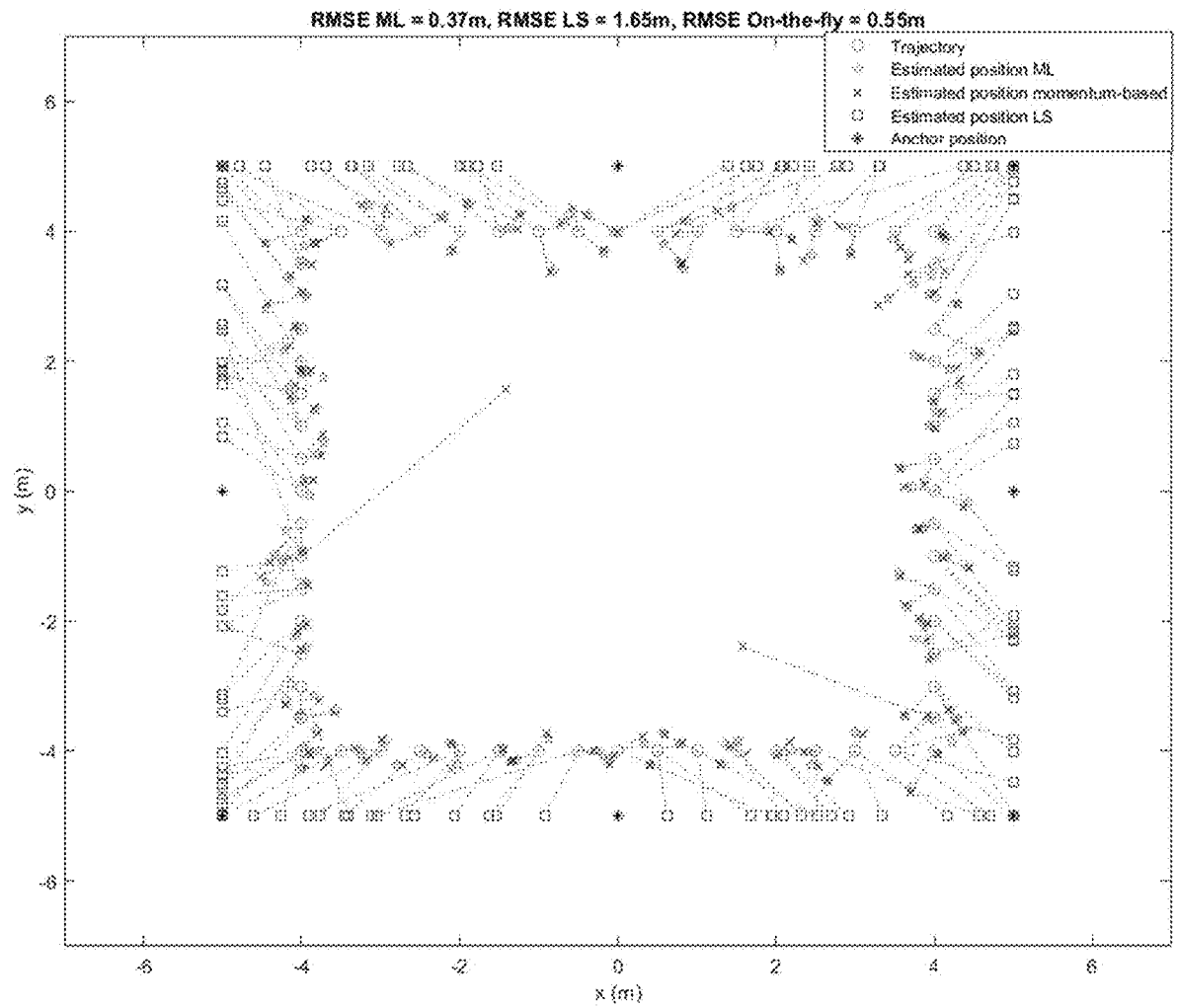
FIG. 6 illustrates the performance of positioning for the MGMP, ML, and LS with $\{\alpha_1=0.7, \mu_1=1.5, \sigma_1=0.5\}$, $\{\alpha_2=0.3, \mu_2=4.5, \sigma_2=0.5\}$ as the components of the underlying noise model, MGMP is initialized with $\{\alpha_1=0.5, \mu_1=1, \sigma_1=0.5\}$, $\{\alpha_2=0.5, \mu_2=2, \sigma_2=0.5\}$, according to example embodiments.

Furthermore, in FIG. 6, the performance of the localization for MGMP, ML, and LS are compared, wherein MGMP is initialized with a GM with two components, i.e. $\{\alpha_1=0.5, \mu_1=1, \sigma_1=0.5\}$, $\{\alpha_2=0.5, \mu_2=2, \sigma_2=0.5\}$.

Note that RMSE (indicated in the title of FIG. 6) is a metric which stands for root means square error. It is considered that the momentum coefficient at time instant l is given as $$\beta_l = \begin{cases} 0.05 & 1 \leq l \leq 8 \\ 0.04 & 9 \leq l \leq 11 \\ 0.03 & 12 \leq l \leq 18 \\ 0.02 & 19 \leq l \leq 20 \\ 0.01 & 21 \leq l \leq 23 \\ 0.005 & \text{others} \end{cases}, \tag{18}$$

Figure 7A:
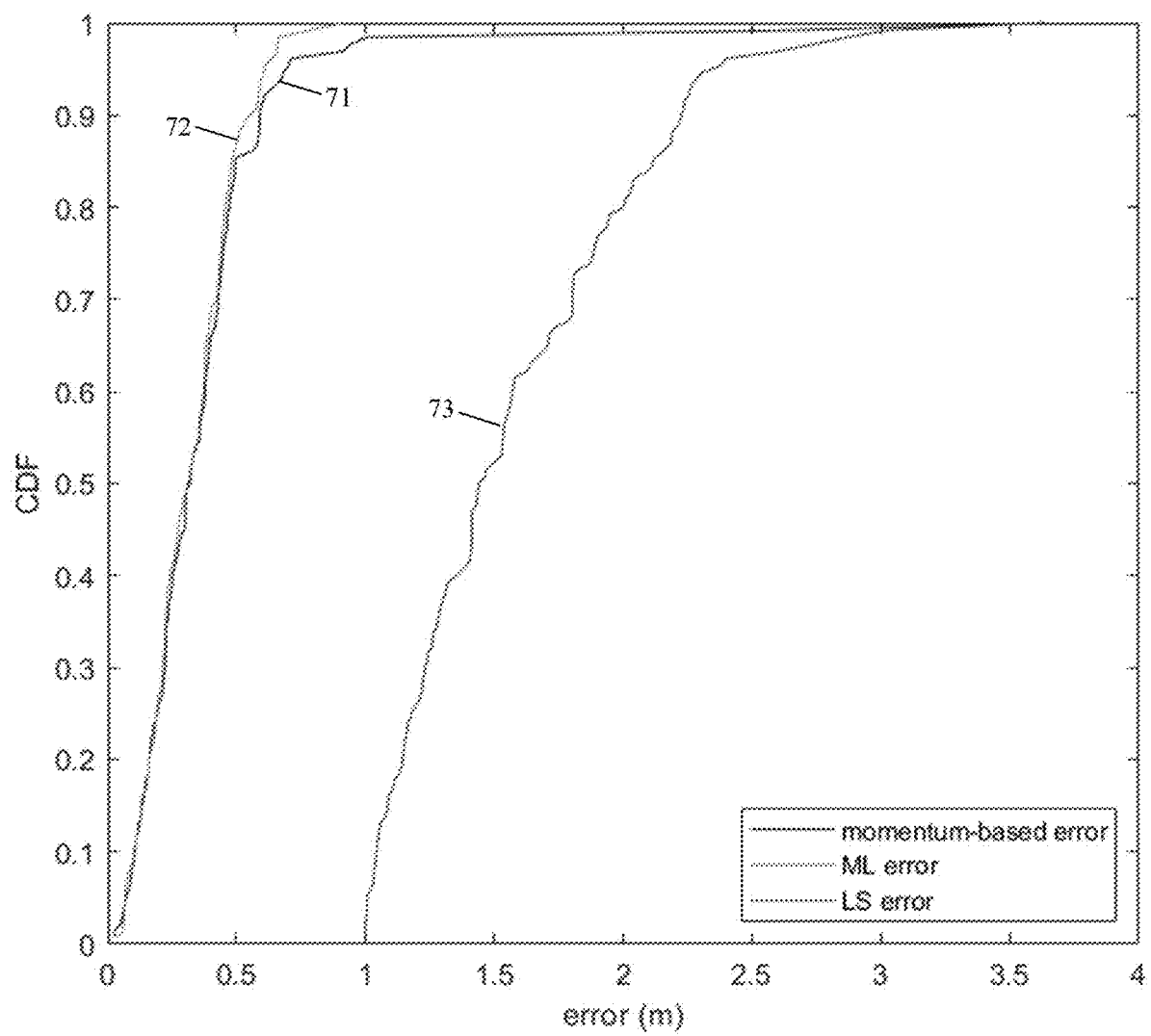
FIG. 7A illustrates the CDF of positioning error corresponding to FIG. 6, according to example embodiments.

Now, with respect to FIG. 7A comprising curves 71 (momentum-based error), 72 (ML error), and 73 (LS error), the cumulative distribution function (CDF) of the localization error is illustrated. As it can be seen, MGMP especially approaches ML performance.

Figure 7B:
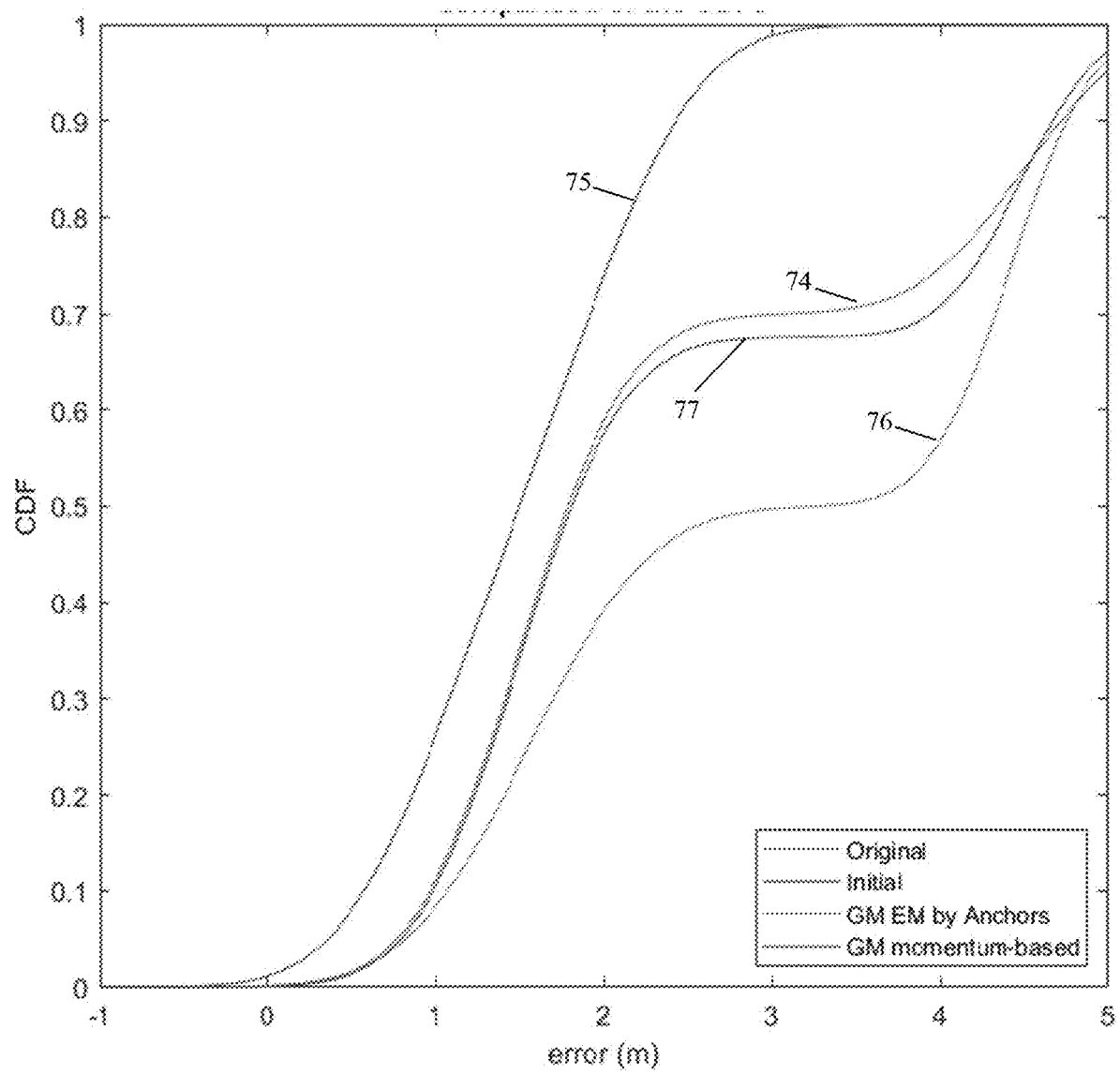
FIG. 7B illustrates a comparison between the CDFs of initial GM, MGMP estimation, GM estimation using only anchors, and the underlying noise corresponding to FIG. 6, according to example embodiments.

Furthermore, in FIG. 7B comprising curves 74 (original), 75 (initial), 76 (GM EM by anchors), and 77 (GM momentum-based), the CDF of the initial GM in MGMP, underlying GM noise model, GM estimated using only anchors (step 1 of MGMP in the sense of the disclosure), and final MGMP estimation are compared.

Figure 8:
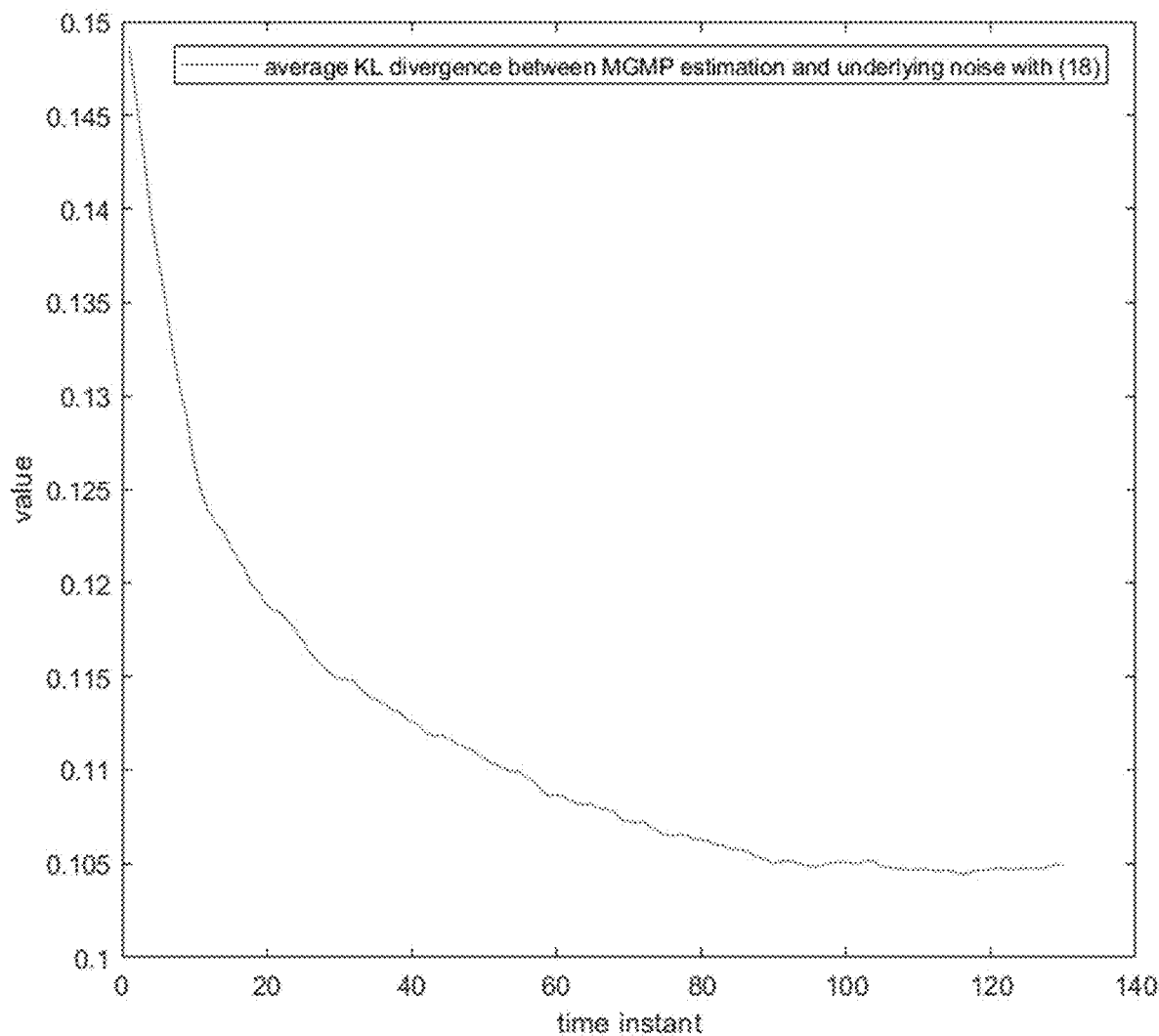
FIG. 8 shows the evolution of the KL divergence between MGMP estimation and the underlying noise corresponding to FIG. 6, according to example embodiments.

Moreover, according to FIG. 8, the average KL divergence is shown between the distributions of MGMP estimation and the underlying noise. This plot has especially been obtained with averaging of 100 independent simulations. As it can be seen, on average the KL divergence is between MGMP and underlying noise reduces, which means that the estimation improves over time.

Especially to verify the performance of MGMP by measurements, two sets of measurements have been considered, i.e., "8_shape_HVpolarized_VNA" and "8_shape_HVpolarized_FW153_no_interference".

In the "8_shape_HVpolarized_VNA", the corresponding measurements have been done based on a vector network analyzer (VNA). In the "8_shape_HVpolarized_FW153_no_interference", the corresponding measurements have been collected based on Bluetooth low energy transceivers where the interference sources such as WIFI in the measurement setup have been disabled.

In these two case studies, there are four anchors and one agent $N_A=4$, $N_S=1$, i.e., at each time instant four samples are available. The underlying noise model can be extracted from the measurement samples as a GM with three components. It is noted that a major performance improvement has especially not been seen by considering two initial GM components in MGMP compared to MGMP initialized by only one Gaussian component, in these two case studies.

This may especially be due to the fact that the two dominant noise components of the underlying noise model have similarities, hence, it can be well approximated with single Gaussian. For the following results, we initialized MGMP with a Gaussian with $\{\alpha_1=1, \mu_1=1, \sigma_1=1\}$ parameters.

Figure 9:
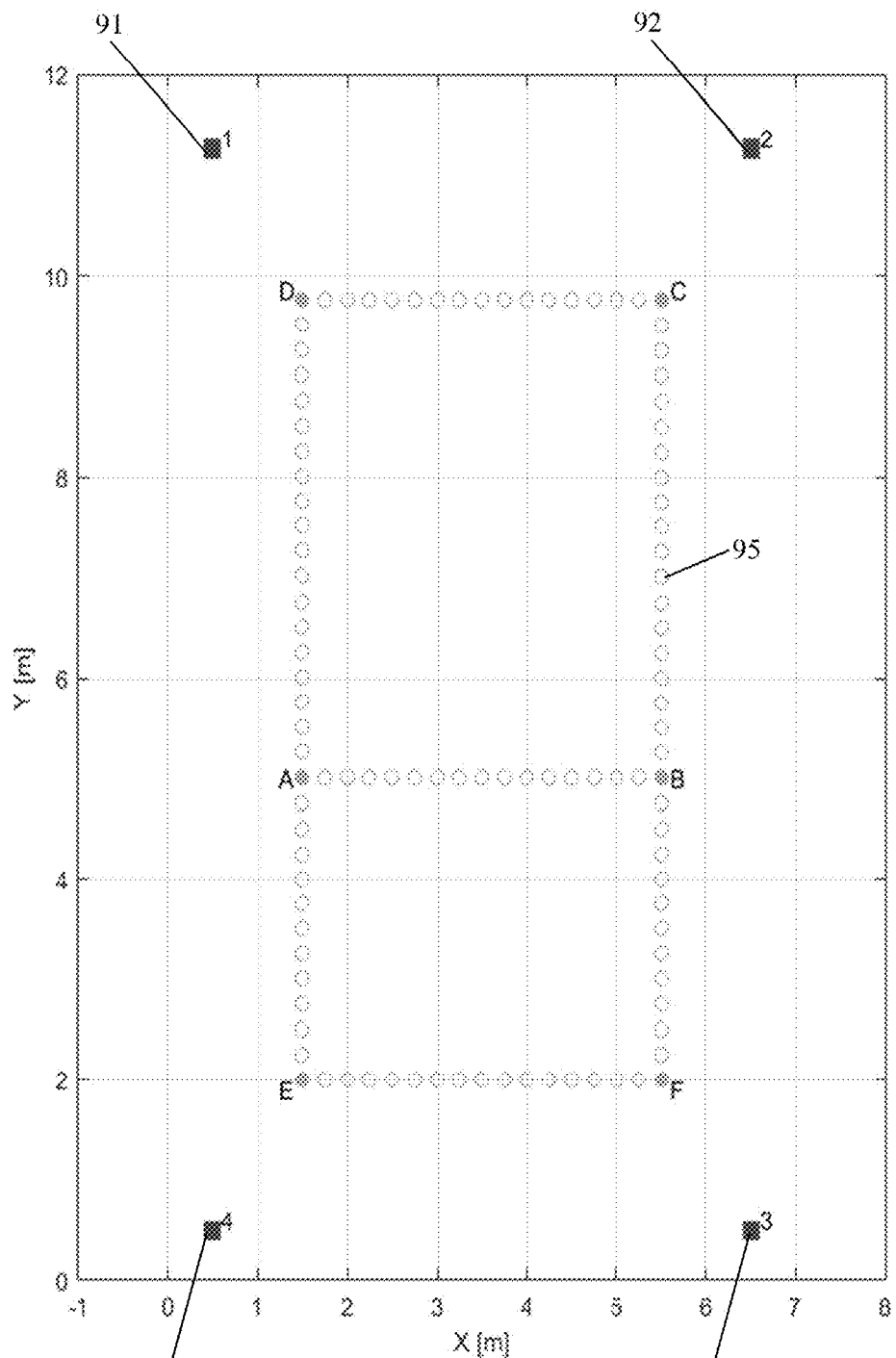
FIG. 9 shows a schematic of a measurement setup, according to example embodiments

Now, with respect to FIG. 9, the corresponding schematic of the measurement setup is shown. The four anchors are shown with squares 91, 92, 93, 94 at the corner of a room and the location of agent in the measurement is shown with circles such as circle 95.

Figure 10A:
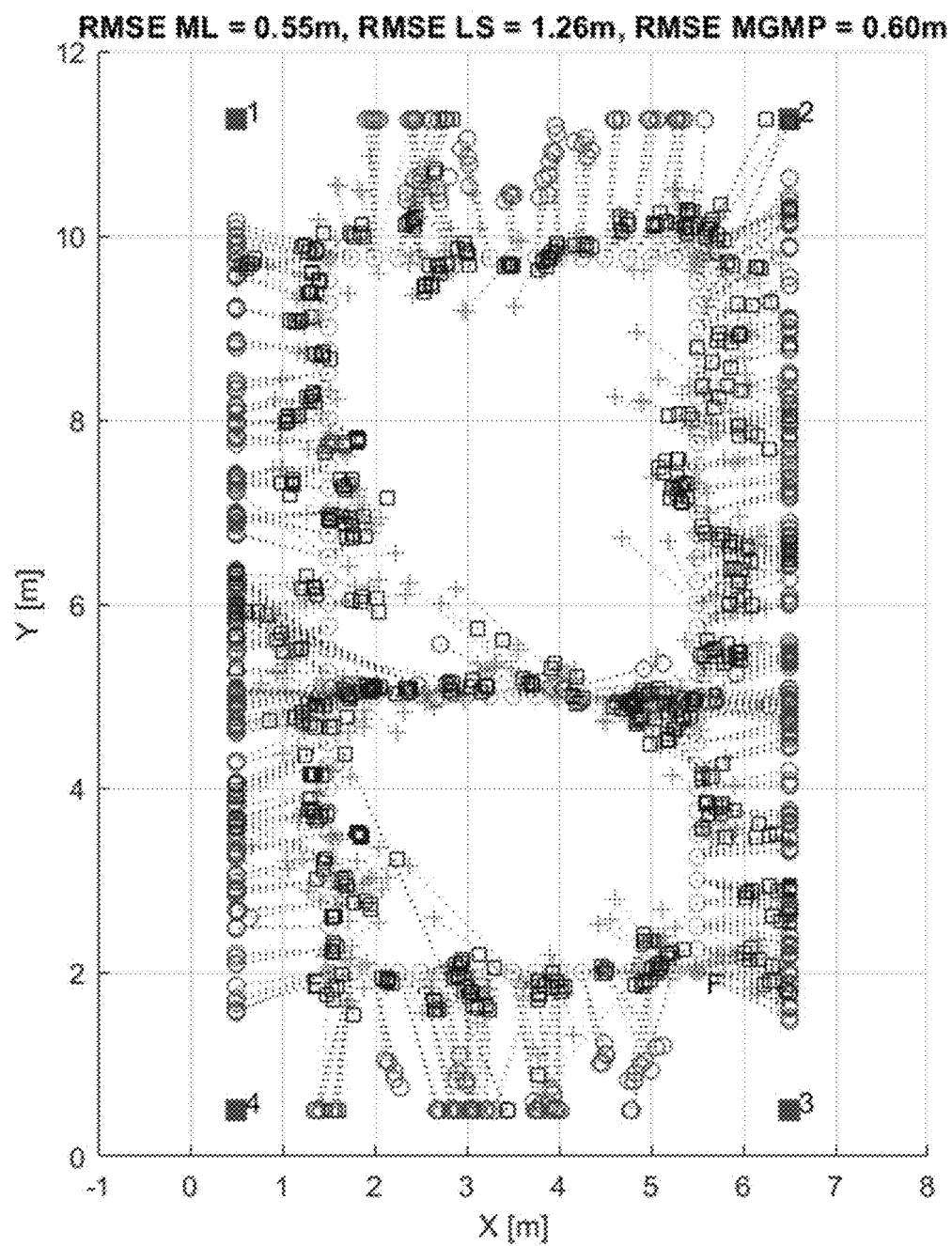
FIG. 10A illustrates a comparison between the performance of MGMP, ML, and LS with measurement results "8_shape_HVpolarized_VNA," according to example embodiments.
Figure 10B:
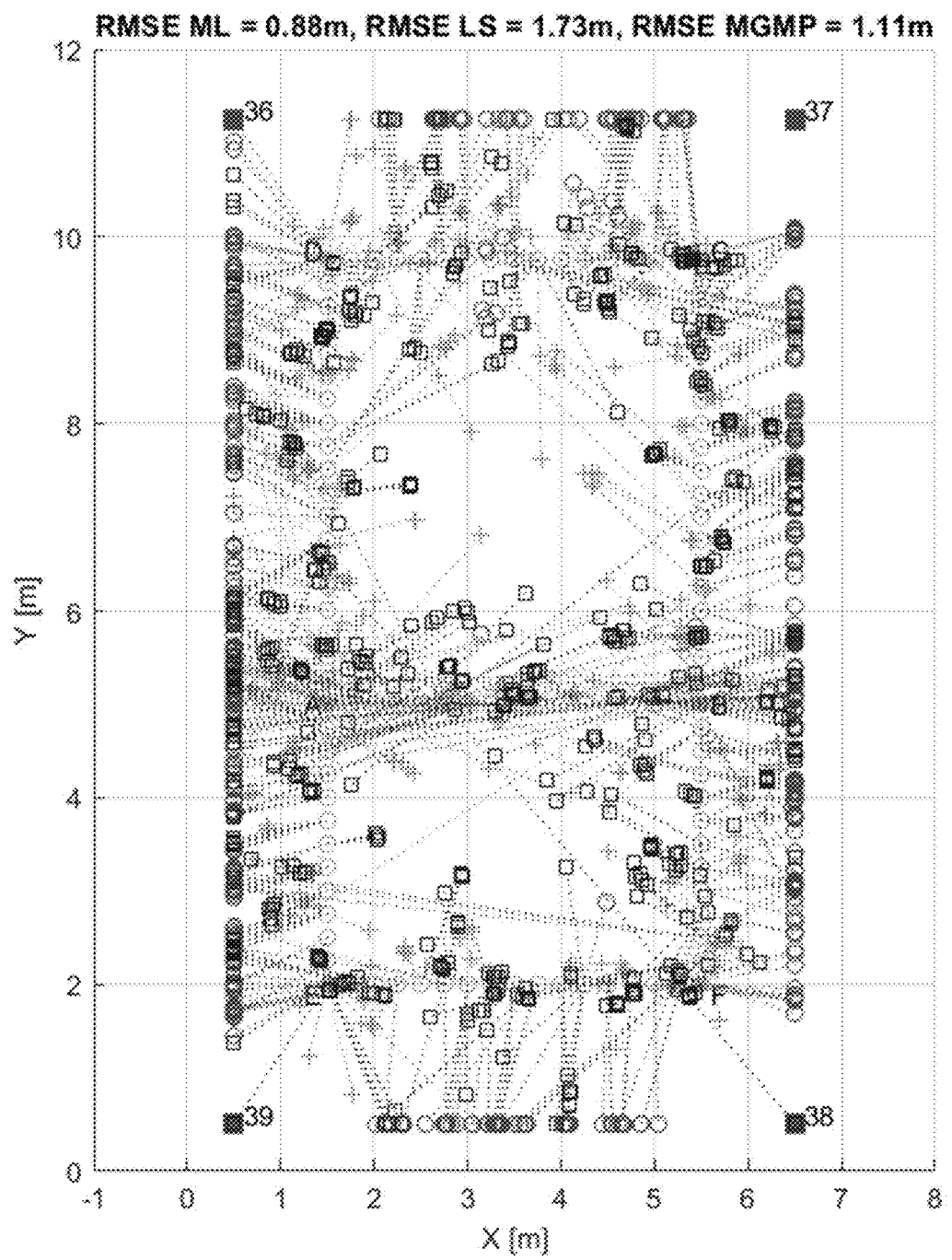
FIG. 10B illustrates a comparison between the performance of MGMP, ML, and LS with measurement results "8_shape_HVpolarized_FW153_no_interference," according to example embodiments.

Furthermore, in FIGS. 10A and 10B, the performance of the localization for MGMP, ML, and LS are compared for the considered measurement case studies, wherein squares, plus, circles are the result of localization for MGMP, ML, and LS.

In both case studies, the momentum coefficient may have been employed at time instant l as $$\beta_l = \frac{2N_A}{\frac{N_A(N_A-1)}{2} + lN_A}. \tag{19}$$

Similar to simulation results, it can especially be seen that MGMP provides a localization accuracy, i.e. the root mean square error (RMSE) of the localization for MGMP approaches the RMSE of the ML localization.

In accordance with all the explanations above: example embodiments or MGMP, respectively, jointly determine the location of an agent and an updated GM estimate about the unknown ranging noise distribution based on the range measurement between the agent and a limited number of anchors. In this context, it is to be emphasized that the limited number of anchors is sufficient. It is additionally to be highlighted that MGMP provides online localization, i.e. no calibration stage is required. Furthermore, MGMP can be used for online localization of multiple agents. It is further remarked that MGMP can be applied to various ranging schemes such as phase-based ranging, UWB ranging, ToA, and TDoA.

Figure 11:
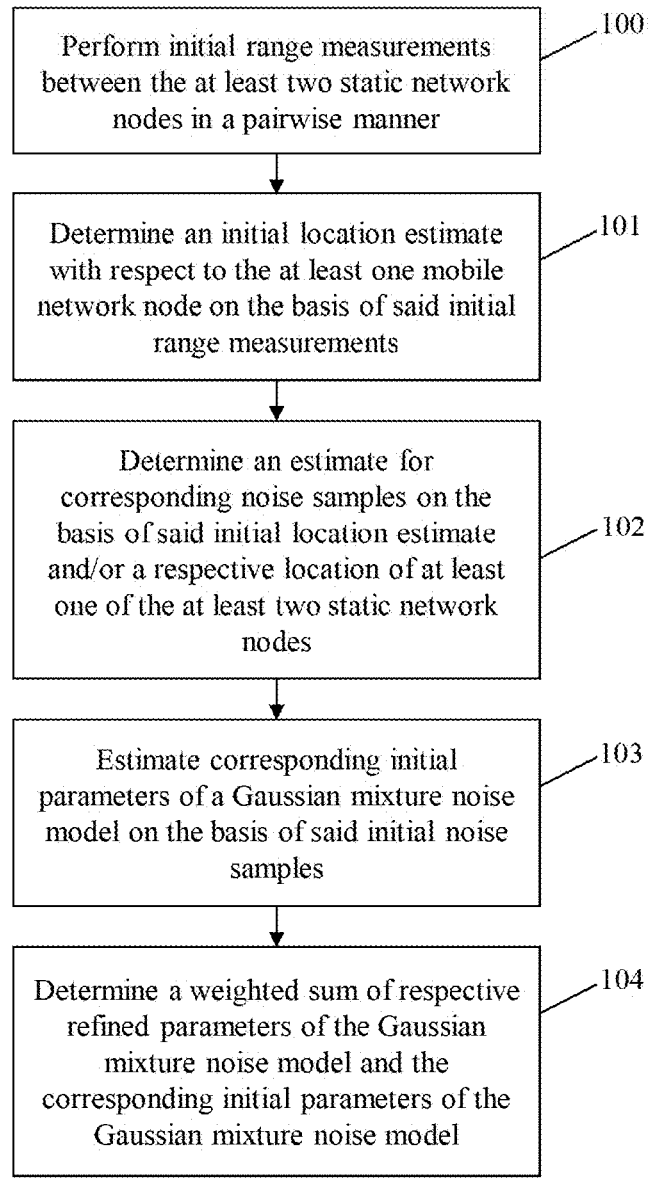
FIG. 11 shows a flow chart of a method, according to example embodiments.

Now, with respect to FIG. 11, it is noted that there is provided a flow chart of a further embodiment of the method for estimating a location of at least one mobile network node of a wireless communication network comprising the at least one mobile network node and at least two static network nodes.

In accordance with FIG. 11, in a first step 100, initial range measurements are performed between the at least two static network nodes in a pairwise manner. Furthermore, in a second step 101, an initial location estimate is determined with respect to the at least one mobile network node on the basis of the initial range measurements.

Moreover, in a third step 102, an estimate for corresponding noise samples is determined on the basis of the initial location estimate and/or a respective location of at least one of the at least two static network nodes. In addition to this, in a fourth step 103, corresponding initial parameters of a Gaussian mixture noise model are estimated on the basis of the initial noise samples. Further additionally, in a fifth step 104, a weighted sum of respective refined parameters of the Gaussian mixture noise model and the corresponding initial parameters of the Gaussian mixture noise model is determined.

In this context, it might be useful if determining (step 104) the weighted sum comprises the usage of a momentum factor, wherein the momentum factor provides a balance between the respective refined parameters of the Gaussian mixture noise model before an iterative estimation and the respective refined parameters of the Gaussian mixture noise model after an iterative estimation.

In addition to this or as an alternative, it might be useful if estimating (step 103) the corresponding initial parameters of the Gaussian mixture noise model is iterated such that the Gaussian mixture noise model fits best to the initial noise samples.

Further additionally or further alternatively, it might be useful if estimating (step 103) the corresponding initial parameters of the Gaussian mixture noise model comprises determining the respective probability of contributing of the corresponding component of the Gaussian mixture noise model to each of the initial noise samples, and/or maximizing a respective match between the corresponding initial parameters of the Gaussian mixture noise model and the initial noise samples.

Figure 12:
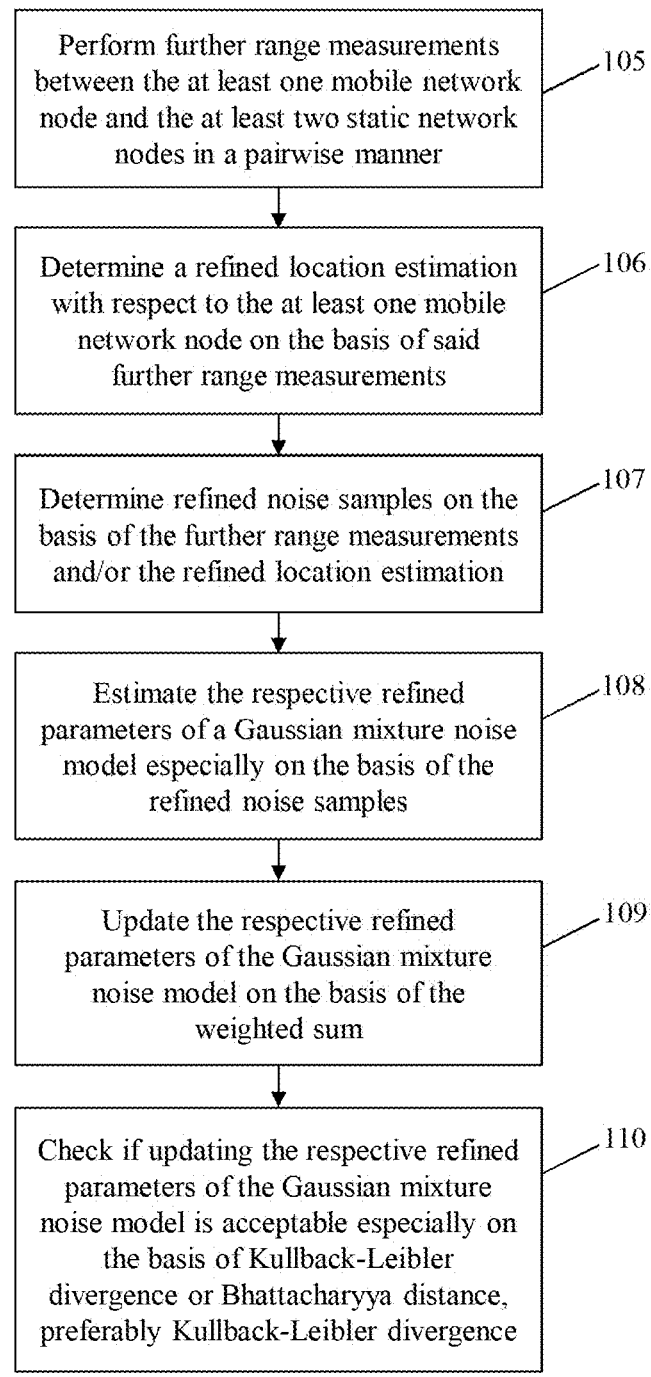
FIG. 12 shows a flow chart of a method, according to example embodiments.

Moreover, as it can be seen from FIG. 12, in accordance with step 105 or step 106, respectively, the method may further comprise the step of performing (step 105) further range measurements between the at least one mobile network node and the at least two static network nodes in a pairwise manner, and/or determining (step 106) a refined location estimation with respect to the at least one mobile network node on the basis of the further range measurements.

According to step 107 of FIG. 12, it might be useful if the method further comprises the step of determining refined noise samples on the basis of the further range measurements and/or the refined location estimation.

Furthermore, according to step 108 of FIG. 12, the method may additionally or alternatively comprise the step of estimating the respective refined parameters of a Gaussian mixture noise model especially on the basis of the refined noise samples.

It is noted that it might be useful if estimating the respective refined parameters of the Gaussian mixture noise model is iterated, such that the Gaussian mixture noise model fits best to the refined noise samples.

Additionally or alternatively, it is noted that it might be useful if estimating the respective refined parameters of the Gaussian mixture noise model comprises determining the respective probability of contributing of the corresponding component of the Gaussian mixture noise model to each of the refined noise samples, and/or maximizing a respective match between the respective refined parameters of the Gaussian mixture noise model and the refined noise samples.

Moreover, in accordance with step 109 of FIG. 12, the method may comprise the step of updating the respective refined parameters of the Gaussian mixture noise model on the basis of the weighted sum.

As illustrated by step 110 of FIG. 12, it is noted that it might be useful if the method comprises the step of checking if updating the respective refined parameters of the Gaussian mixture noise model is acceptable especially on the basis of Kullback-Leibler divergence or Bhattacharyya distance.

It is further noted it might be useful if at least a part of the steps according to FIG. 11 and/or FIG. 12 is repeated. This may analogously apply not only for FIG. 4 but also for any combination of FIG. 4, FIG. 11, and FIG. 12.

Figure 13:
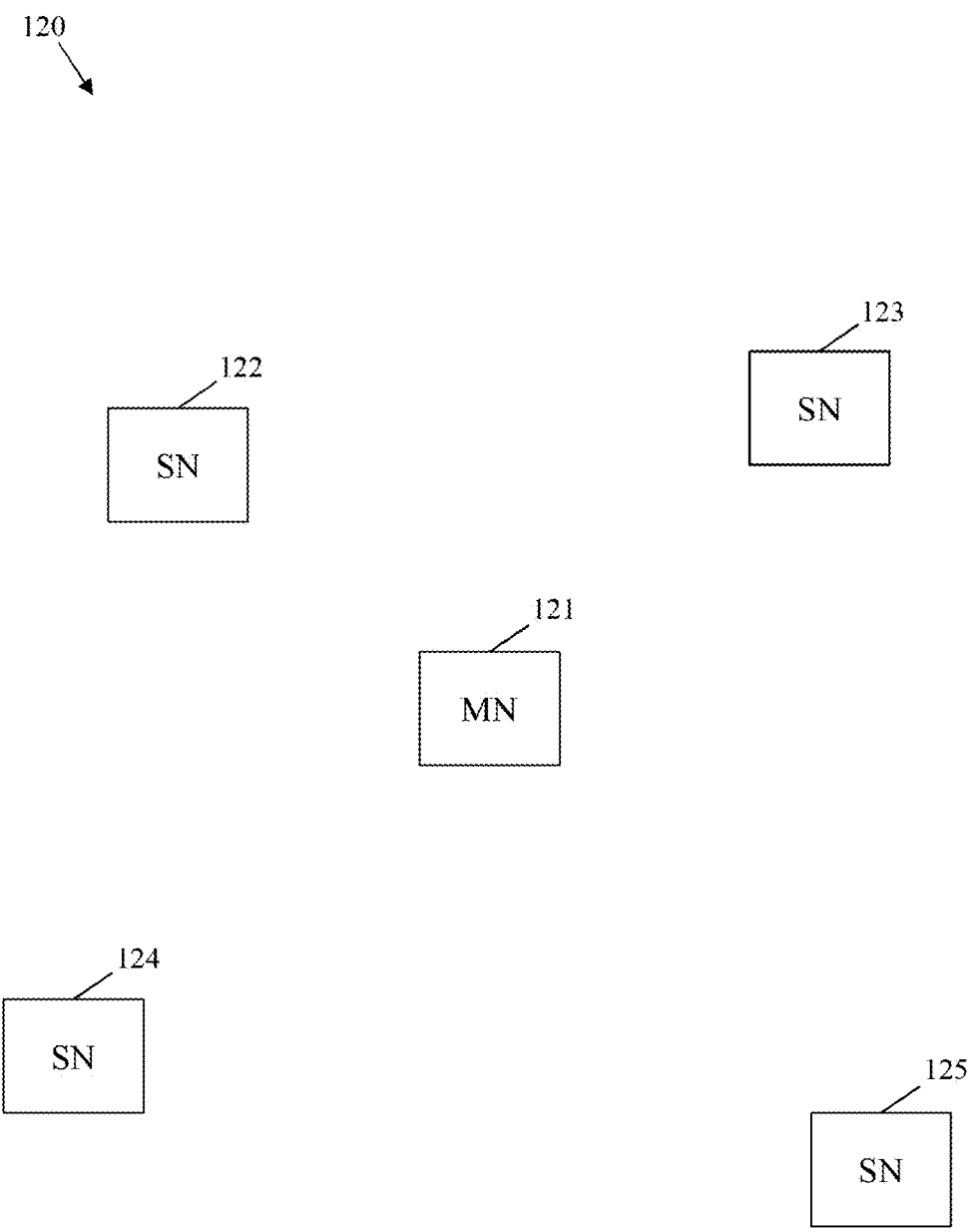
FIG. 13 shows a wireless communication network with location estimation of at least one mobile network node, according to example embodiments.

Finally, FIG. 13 illustrates an example embodiment of the wireless communication network 120 with location estimation of at least one mobile network node 121. In accordance with FIG. 12, the wireless communication network 120 comprises subscribers (e.g., the five subscribers 121, 122, 123, 124, 125) comprising the at least one mobile network node (e.g., the mobile network node 121) and at least two static network nodes (e.g., the four static network nodes 122, 123, 124, 125).

In this context, at least one subscriber is configured to perform initial range measurements between the static network nodes 122 to 125 in a pairwise manner, determine an initial location estimate with respect to the mobile network node 121 on the basis of the initial range measurements, determine an estimate for corresponding noise samples on the basis of the initial location estimate and/or a respective location of at least one of the static network nodes 122 to 15, estimate corresponding initial parameters of a Gaussian mixture noise model on the basis of the initial noise samples, and determine a weighted sum of respective refined parameters of the Gaussian mixture noise model and the corresponding initial parameters of the Gaussian mixture noise model.

While various embodiments have been described above, it should be understood that they have been presented by way of example only, and not limitation. Numerous changes to the disclosed embodiments can be made in accordance with the disclosure herein without departing from the spirit or scope of the disclosure. Thus, the breadth and scope of the present disclosure should not be limited by any of the above-described embodiments. Rather, the scope of the disclosure should be defined in accordance with the following claims and their equivalents.

Although example embodiments has been illustrated and described with respect to one or more implementations, equivalent alterations and modifications will occur to others skilled in the art upon the reading and understanding of this specification and the accompanying drawings. In addition, while a particular feature may have been disclosed with respect to only one of several implementations, such feature may be combined with one or more other features of the other implementations for any given or particular application.

What is claimed is:

1. A method for estimating a location of a mobile network node of a wireless communication network comprising the mobile network node and at least two static network nodes, wherein the method comprises:
performing initial range measurements between the at least two static network nodes in a pairwise manner;
determining an initial location estimate of the mobile network node on the basis of the initial range measurements;
determining an estimate for corresponding initial noise samples on the basis of the initial location estimate or a respective location of at least one of the at least two static network nodes;
estimating corresponding initial parameters of a Gaussian mixture noise model on the basis of the initial noise samples;
moving the mobile network node relative to the at least two static network nodes after determining the initial location estimate; and
again localizing the mobile network node upon moving the mobile network node, wherein again localizing the mobile network node comprises:
computing a new location estimate for the mobile network node using the initial parameters of the Gaussian mixture noise model and noisy range measurements between the mobile network node and the at least two static nodes;
computing new noise samples using the location of the at least two static nodes and the new location estimate; and
determining new parameters for the Gaussian mixture noise model by performing expectation maximization with the computed new noise samples and the initial parameters of the Gaussian mixture noise model as inputs.

2. The method according to claim 1,
further comprising determining a weighted sum of respective refined parameters of the Gaussian mixture noise model and the corresponding initial parameters of the Gaussian mixture noise model,
wherein the weighted sum is determined based on a momentum factor, and
wherein the momentum factor provides a balance between the respective refined parameters of the Gaussian mixture noise model before an iterative estimation and the respective refined parameters of the Gaussian mixture noise model after an iterative estimation.

3. The method according to claim 1,
wherein estimating the corresponding initial parameters of the Gaussian mixture noise model is iterated such that the Gaussian mixture noise model fits best to the initial noise samples.

4. The method according to claim 1,
wherein estimating the corresponding initial parameters of the Gaussian mixture noise model comprises:
determining the respective probability of contributing of the corresponding component of the Gaussian mixture noise model to each of the initial noise samples; or
maximizing a respective match between the corresponding initial parameters of the Gaussian mixture noise model and the initial noise samples.

5. The method according to claim 1, further comprising:
performing further range measurements between the mobile network node and the at least two static network nodes in a pairwise manner; and
determining a refined location estimation with respect to the mobile network node based on the further range measurements.

6. The method according to claim 5, further comprising:
determining refined noise samples based on the further range measurements or the refined location estimation.

7. The method according to claim 6, further comprising:
estimating respective refined parameters of a Gaussian mixture noise model based on the refined noise samples.

8. The method according to claim 7,
wherein estimating the respective refined parameters of the Gaussian mixture noise model is iterated, such that the Gaussian mixture noise model fits best to the refined noise samples.

9. The method according to claim 7,
wherein estimating the respective refined parameters of the Gaussian mixture noise model comprises:
determining the respective probability of contributing of the corresponding component of the Gaussian mixture noise model to each of the refined noise samples; or
maximizing a respective match between the respective refined parameters of the Gaussian mixture noise model and the refined noise samples.

10. The method according to claim 6, wherein:
the initial noise samples comprise or are ranging errors; or
the refined noise samples comprise or are ranging errors; or
noise is caused at least by multipath propagation of the corresponding signals within the wireless communication network; or
the mobile network node communicates in a bidirectional manner; or
at least one of the at least two static network nodes communicates in a bidirectional manner.

11. The method according to claim 1, wherein localizing the mobile network node comprises estimating candidate parameters for the Gaussian mixture noise model by computing a weighted sum of the initial parameters for the Gaussian mixture noise model and the new parameters for the Gaussian mixture noise model.

12. The method according to claim 11,
wherein the weighted sum is computed using a momentum factor, and
wherein the momentum factor is chosen from a predefined set of values and provides a balance between the initial parameters for the Gaussian mixture noise model and the new parameters for the Gaussian mixture noise model.

13. The method according to claim 1, further comprising:
performing additional initial range measurements between the at least two static network nodes in a pairwise manner; or
determining an additional initial location estimate with respect to the at least one mobile network node on the basis of the additional initial range measurements; or
determining an additional estimate for corresponding noise samples on the basis of the additional initial location estimate or an additional respective location of at least one of the at least two static network nodes; or
estimating additional corresponding initial parameters of an additional Gaussian mixture noise model on the basis of the additional initial noise samples; or
determining an additional weighted sum of additional respective refined parameters of the additional Gaussian mixture noise model and the corresponding initial parameters of the Gaussian mixture noise model.

14. A wireless communication network with location estimation of a mobile network node, wherein the wireless communication network comprises subscribers comprising the mobile network node and at least two static network nodes, and wherein the subscribers are configured to:
perform initial range measurements between the at least two static network nodes in a pairwise manner;
determine an initial location estimate of the mobile network node on the basis of the initial range measurements;
determine an estimate for corresponding initial noise samples on the basis of the initial location estimate or a respective location of at least one of the at least two static network nodes;
estimate corresponding initial parameters of a Gaussian mixture noise model on the basis of the initial noise samples;
move the mobile network node relative to the at least two static network nodes after determining the initial location estimate; and
again localize the mobile network node upon moving the mobile network node, wherein again localizing the mobile network node comprises:
computing a new location estimate for the mobile network node using the initial parameters of the Gaussian mixture noise model and noisy range measurements between the mobile network node and the at least two static nodes;
computing new noise samples using the location of the at least two static nodes and the new location estimate; and
determining new parameters for the Gaussian mixture noise model by performing expectation maximization with the computed new noise samples and the initial parameters of the Gaussian mixture noise model as inputs.

15. The wireless communication network according to claim 14,
wherein at least one of the subscribers is configured to determine a weighted sum of respective refined parameters of the Gaussian mixture noise model and the corresponding initial parameters of the Gaussian mixture noise model,
wherein the weighted sum is determined based on a momentum factor, and
wherein the momentum factor provides a balance between the respective refined parameters of the Gaussian mixture noise model before an iterative estimation and the respective refined parameters of the Gaussian mixture noise model after an iterative estimation.

16. The wireless communication network according to claim 14, wherein estimating the corresponding initial parameters of the Gaussian mixture noise model is iterated such that the Gaussian mixture noise model fits best to the initial noise samples.

17. The wireless communication network according to claim 14, wherein estimating the corresponding initial parameters of the Gaussian mixture noise model comprises:
determining the respective probability of contributing of the corresponding component of the Gaussian mixture noise model to each of the initial noise samples; or
maximizing a respective match between the corresponding initial parameters of the Gaussian mixture noise model and the initial noise samples.

18. The wireless communication network according to claim 14, wherein at least one of the subscribers is further configured to:
perform further range measurements between the mobile network node and the at least two static network nodes in a pairwise manner; and determine a refined location estimation with respect to the mobile network node based on the further range measurements.

19. The wireless communication network according to claim 18, wherein the at least one subscriber is further configured to:
determine refined noise samples based on the further range measurements or the refined location estimation.

20. The wireless communication network according to claim 19, wherein the at least one subscriber is further configured to:
estimate respective refined parameters of a Gaussian mixture noise model based on the refined noise samples.

* * * * *